United States Patent
Chen et al.

(10) Patent No.: US 12,425,312 B2
(45) Date of Patent: Sep. 23, 2025

(54) METHOD, APPARATUS, AND SYSTEM FOR DEPLOYING SERVICE

(71) Applicant: Huawei Technologies Co., Ltd., Shenzhen (CN)

(72) Inventors: Zhong Chen, Beijing (CN); Bin Dong, Beijing (CN); Wenqiang Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/468,136

(22) Filed: Sep. 15, 2023

(65) Prior Publication Data
US 2024/0007364 A1   Jan. 4, 2024

Related U.S. Application Data

(63) Continuation of application No. PCT/CN2022/076601, filed on Feb. 17, 2022.

Foreign Application Priority Data

Mar. 18, 2021 (CN) .......................... 202110293083.8
Sep. 30, 2021 (CN) .......................... 202111164145.1

(51) Int. Cl.
*H04L 41/5051* (2022.01)
*H04L 12/46* (2006.01)
*H04L 41/40* (2022.01)
*H04L 67/141* (2022.01)

(52) U.S. Cl.
CPC ...... *H04L 41/5051* (2013.01); *H04L 12/4641* (2013.01); *H04L 41/40* (2022.05); *H04L 67/141* (2013.01)

(58) Field of Classification Search
CPC ......... H04L 41/00; H04L 41/12; H04L 41/40; H04L 41/5051; H04L 12/4641; H04L 67/141
See application file for complete search history.

(56) References Cited

U.S. PATENT DOCUMENTS

| | | | |
|---|---|---|---|
| 6,487,581 B1 | 11/2002 | Spence et al. | |
| 10,009,443 B1 | 6/2018 | Guigli | |
| 10,719,369 B1 * | 7/2020 | Aithal | H04L 63/0263 |
| 11,196,749 B2 * | 12/2021 | Bhuiyan | H04L 63/0807 |

(Continued)

FOREIGN PATENT DOCUMENTS

| | | |
|---|---|---|
| CN | 103905508 A | 7/2014 |
| CN | 107786593 A | 3/2018 |

(Continued)

*Primary Examiner* — Rachel J Hackenberg
(74) *Attorney, Agent, or Firm* — Conley Rose, P.C.

(57) ABSTRACT

A method for deploying a service includes a controller that creates a service instance corresponding to a service, and creates, in the service instance, a first network instance and a second network instance that correspond to the service. The first network instance is a network instance corresponding to a first device, and the first network instance includes a device identifier of the first device. The second network instance is a network instance corresponding to a first cloud provider edge PE, and the second network instance includes a device identifier of the first cloud PE. The first cloud PE is for connecting to the first cloud.

20 Claims, 11 Drawing Sheets

(56) References Cited

U.S. PATENT DOCUMENTS

| | | | |
|---|---|---|---|
| 2002/0069335 A1* | 6/2002 | Flylnn, Jr. | G06F 3/0683 |
| | | | 711/152 |
| 2009/0327462 A1* | 12/2009 | Adams | H04L 61/5046 |
| | | | 718/1 |
| 2012/0324536 A1* | 12/2012 | McDysan | H04L 12/4645 |
| | | | 709/217 |
| 2019/0014040 A1* | 1/2019 | Yerrapureddy | H04L 45/586 |
| 2020/0136906 A1 | 4/2020 | Guim Bernat et al. | |

FOREIGN PATENT DOCUMENTS

| | | | | |
|---|---|---|---|---|
| CN | 109729162 A | 5/2019 | | |
| EP | 3471342 A1 * | 4/2019 | | G06F 9/45533 |
| WO | 2014101475 A1 | 7/2014 | | |
| WO | WO-2017148219 A1 * | 9/2017 | | H04L 12/46 |

* cited by examiner

| Service instance list | | | |
|---|---|---|---|
| Service instance identifier | Service instance type | Order information | Quantity of network instances |
| Virtual cloud private network A | Single cloud | 123456 | 2 |
| Virtual cloud private network B | Multi cloud | 212345 | 3 |
| Virtual cloud private network C | Single cloud | 311222 | 2 |

FIG. 5B

| | | |
|---|---|---|
| Network instance name | Instance of a CPE 301 | |
| Location information | City A | |
| Device identifier | 111222333 | |
| Network side IP address | 10.10.10.10/20 | |
| Tenant side IP address | 10.1.1.1.1/20 | |
| Routing information | Network segment | 10.1.1.1.1/20 |
| | Next hop | 10.1.1.1.2 |
| | Cancel    OK | |

FIG. 6A

| | |
|---|---|
| Network instance name | Instance of a cloud PE 401 |
| Location information | City A |
| | Device identifier: Cloud PE 401 |
| Provider information | Vendor D |
| IP address for a cloud PE to connect to a cloud | 10.1.2.20/20 |
| VLAN | 100 |

| Interface quality of service information | Bandwidth | 100 Mbps |
|---|---|---|
| Routing information | Network segment | 10.1.2.100/20 |
| | Next hop | 10.1.2.1 |

Cancel    OK

FIG. 6C

METHOD, APPARATUS, AND SYSTEM FOR DEPLOYING SERVICE

CROSS-REFERENCE TO RELATED APPLICATIONS

This application is a continuation application of International Patent Application No. PCT/CN2022/076601, filed on Feb. 17, 2022, which claims priority to Chinese Patent Application No. 202110293083.8, filed on Mar. 18, 2021, and Chinese Patent Application No. 202111164145.1, filed on Sep. 30, 2021. All of the aforementioned applications are hereby incorporated by reference in their entireties.

TECHNICAL FIELD

This application relates to the field of communication technologies, and in particular, to a method, an apparatus, and a system for deploying a service.

BACKGROUND

The increasing trend of enterprise service cloudification brings about wide use of cloud services, and accordingly, enterprise users switch their focuses from network connectivity to service quality, experience, security, and the like. Service providers and carriers are dedicated to providing the enterprise users with a virtual cloud private network service capable of ensuring service quality, experience, and security. However, provisioning and deployment of the service depend on planning and deployment by technical personnel, while service deployment is complex and deployment workload is heavy. As a result, the service deployment is inefficient and error-prone.

SUMMARY

Embodiments of this application provide a method, an apparatus, and a system for deploying a service. A controller is used to create a service instance corresponding to a service, and create a corresponding network instance in the service instance, so that a procedure of service deployment can be simplified, the service deployment is simplified, and efficiency and accuracy of the service deployment are improved.

According to a first aspect, an embodiment of this application provides a method for deploying a service. The service is to provide a virtual cloud private network for a tenant. The virtual cloud private network is used by the tenant to access a first cloud. The foregoing method is performed by a controller. The controller creates a service instance corresponding to the service, and creates a first network instance and a second network instance in the service instance. The first network instance and the second network instance are for deploying the service. The first network instance is a network instance corresponding to a first device, and the first network instance includes a device identifier of the first device. The device identifier of the first device includes but is not limited to an equipment serial number (ESN) of the first device, a device name of the first device, or a media access control (MAC) address of the first device. The second network instance is a network instance corresponding to a first cloud provider edge (PE), and the second network instance includes a device identifier of the first cloud PE. The device identifier of the first cloud PE includes but is not limited to an ESN of the first cloud PE, a device name of the first cloud PE, or a MAC address of the first cloud PE. The first cloud PE is for connecting to the first cloud. The first device and the first cloud PE are edge devices of the virtual cloud private network. The tenant accesses the cloud via the first device and the first cloud PE. In the foregoing method, a procedure of deploying a virtual cloud private network service is simplified into creating the service instance, the first network instance, and the second network instance, so that the service deployment is simplified, and efficiency and accuracy of the service deployment are improved.

In an implementation, before the controller creates the service instance, connection information of the first cloud PE for connecting to the first cloud is set. The connection information includes one or more of the following such as the device identifier of the first cloud PE, location information of the first cloud PE, an identifier of a first interface of the first cloud PE, or an identifier of a first virtual local area network (VLAN) of the first cloud PE. The first VLAN is configured for the first interface. The first cloud PE connects to the first cloud via the first VLAN. The connection information of the first cloud PE is first set in the controller, so that when the service instance or the second network instance is subsequently created, information such as the device identifier and the like of the first cloud PE can be obtained through association based on one or more pieces of information in the connection information. In an example, a quantity of times of setting a network parameter in the service deployment process is reduced, and the efficiency of the service deployment is further improved.

In an implementation, the service instance includes an identifier of the service instance. The identifier of the service instance includes but is not limited to information that can identify the service instance, such as a name of the service instance, an identifier (ID) of the service instance, or the like. The service instance further includes one or more of the following such as a type of the service instance, a quantity of created network instances, or order information of the tenant.

In an implementation, the type of the service instance includes single cloud or multi cloud. The single cloud means that the tenant is capable of accessing only one cloud via the first device. The multi cloud means that the tenant is capable of accessing a plurality of clouds via the first device.

In an implementation, a device type of the first device is customer premises equipment (CPE). When the first device is first CPE, the first network instance further includes one or more of the following such as location information of the first CPE, a network side IP address of the first CPE, a tenant side Internet Protocol (IP) address of the first CPE, or routing information from the first CPE to a local area network of the tenant.

In an implementation, a device type of the first device is a cloud PE. When the first device is a second cloud PE, the second cloud PE is for connecting to a second cloud. In other words, the edge devices of the virtual cloud private network are the second cloud PE and the first cloud PE. The first network instance further includes one or more of the following such as location information of the second cloud PE, provider information of the second cloud, an IP address of the second cloud PE for connecting to the second cloud, routing information of the second cloud PE for connecting to the second cloud, or interface quality of service information of the second cloud PE for connecting to the second cloud.

In an implementation, the second network instance further includes one or more of the following such as the location information of the first cloud PE, provider information of the first cloud, an IP address of the first cloud PE for connecting to the first cloud, routing information of the first cloud PE for connecting to the first cloud, or interface quality of service information of the first cloud PE for connecting to the first cloud.

In an implementation, the controller determines the device identifier of the first cloud PE based on the location information of the first cloud PE and the connection information of the first cloud PE for connecting to the first cloud.

In an implementation, the controller deploys the first network instance and the second network instance. By using the foregoing method, network operation and maintenance personnel simplify the procedure of deploying a virtual cloud private network service into creating the service instance on the controller, creating the first network instance and the second network instance, and deploying the first network instance and the second network instance on the controller. In this method, the procedure of service deployment is further simplified, the service deployment is simplified, and efficiency and accuracy of the service deployment are improved. In an implementation, the controller sends, to the first device, first configuration information for configuring the service; and sends, to the first cloud PE, second configuration information for configuring the service.

In an implementation, the controller determines the first configuration information and the second configuration information based on the first network instance, the second network instance, and a first service template. The first service template indicates configuration information of the service instance. The configuration information of the service instance includes one or more of the following such as tunnel configuration information, a virtual private network (VPN) instance configuration information, or routing information. Before deploying the first network instance and the second network instance, the controller sets the first service template based on the type of the service instance. An objective of setting the first service template is to perform template-based configuration on a service corresponding to the service instance in terms of configuration information such as tunnel configuration, VPN instance configuration, routing configuration, and the like. In a service deployment process, a service instance of each type corresponds to one service template, and configuration information of the service instance can be quickly obtained, avoiding that the network operation and maintenance personnel need to set a large amount of configuration information for each service during service deployment. The method of obtaining the configuration information using the service template simplifies a procedure of obtaining the configuration information during deployment of the virtual cloud private network service, and further improves the efficiency of the service deployment.

In an implementation, the virtual cloud private network is further used by the tenant to access a third cloud. The controller creates a third network instance in the service instance. The third network instance is a network instance corresponding to a third cloud PE, and the third network instance includes a device identifier of the third cloud PE. The third cloud PE is for connecting to the third cloud.

In an implementation, before creating the service instance, the controller receives a first request sent by a service deployment apparatus. The first request is used by the service deployment apparatus to invoke a first application programming interface (API) of the controller to create the service instance. The first request includes the identifier of the service instance. The first request further includes one or more of the following such as the type of the service instance, an identifier of the tenant, or the order information of the tenant.

In an implementation, before creating the first network instance and the second network instance, the controller receives a second request sent by the service deployment apparatus. The second request is used by the service deployment apparatus to invoke a second API of the controller to create the first network instance and/or the second network instance. The second request includes information for creating the first network instance and/or information for creating the second network instance. The information for creating the first network instance includes the identifier of the service instance, an identifier of the first network instance, and the device identifier of the first device. The information for creating the second network instance includes the identifier of the service instance, an identifier of the second network instance, and the device identifier of the first cloud PE.

In an implementation, when the first device is first CPE, the information for creating the first network instance further includes one or more of the following such as the location information of the first CPE, the network side IP address of the first CPE, the tenant side IP address of the first CPE, or the routing information from the first CPE to the local area network of the tenant.

In an implementation, the second cloud PE is for connecting to the second cloud. When the first device is the second cloud PE, the information for creating the first network instance further includes one or more of the following such as the location information of the second cloud PE, the provider information of the second cloud, the IP address of the second cloud PE for connecting to the second cloud, the routing information of the second cloud PE for connecting to the second cloud, or the interface quality of service information of the second cloud PE for connecting to the second cloud.

In an implementation, the information for creating the second network instance includes one or more of the following such as the location information of the first cloud PE, the provider information of the first cloud, the IP address of the first cloud PE for connecting to the first cloud, the routing information of the first cloud PE for connecting to the first cloud, or the interface quality of service information of the first cloud PE for connecting to the first cloud.

In an implementation, before deploying the first network instance and the second network instance, the controller receives a third request sent by the service deployment apparatus. The third request is used by the service deployment apparatus to invoke a third API of the controller to deploy the first network instance and/or the second network instance. The third request includes information for deploying the first network instance and/or information for deploying the second network instance. The information for deploying the first network instance includes the identifier of the service instance and the identifier of the first network instance. The information for deploying the second network instance includes the identifier of the service instance and the identifier of the second network instance.

In an implementation, the controller sends deployment result information of the first network instance and/or deployment result information of the second network instance to the service deployment apparatus. The deployment result information of the first network instance includes but is not limited to the identifier of the first network instance, a deployment success flag of the first network instance, a deployment failure flag of the first network instance, or a deployment failure cause of the first network instance. The deployment result information of the second network instance includes but is not limited to the identifier of the second network instance, a deployment success flag of the second network instance, a deployment failure flag of the second network instance, or a deployment failure cause of the second network instance.

In an implementation, the controller receives a fourth request sent by the service deployment apparatus. The fourth request is for invoking a fourth API of the controller to obtain the deployment result information of the first network instance and/or the deployment result information of the second network instance.

In an implementation, the controller sends creation result information of the service instance to the service deployment apparatus. The creation result information of the service instance includes but is not limited to the identifier of the service instance, a creation success flag of the service instance, a creation failure flag of the service instance, or a creation failure cause of the service instance.

In an implementation, the controller receives a fifth request sent by the service deployment apparatus. The fifth request is for invoking a fifth API of the controller to obtain the creation result information of the service instance.

In an implementation, the controller sends creation result information of the first network instance and/or creation result information of the second network instance to the service deployment apparatus. The creation result information of the first network instance includes but is not limited to the identifier of the first network instance, a creation success flag of the first network instance, a creation failure flag of the first network instance, or a creation failure cause of the first network instance. The creation result information of the second network instance includes but is not limited to the identifier of the second network instance, a creation success flag of the second network instance, a creation failure flag of the second network instance, or a creation failure cause of the second network instance.

In an implementation, the controller receives a sixth request sent by the service deployment apparatus. The sixth request is for invoking a sixth API of the controller to obtain the creation result information of the first network instance and/or the creation result information of the second network instance. In an implementation, the virtual cloud private network is used by at least one site of the tenant to access the first cloud via at least one virtual private line.

In an implementation, the first cloud includes at least one virtual private cloud (VPC).

In an implementation, a type of each of the at least one site of the tenant includes a branch network or a cloud.

According to a second aspect, an embodiment of this application provides a method for deploying a service. The service is to provide a virtual cloud private network for a tenant. The virtual cloud private network is used by the tenant to access a first cloud. The foregoing method is performed by a service deployment apparatus. The service deployment apparatus sends a first request to a controller. The first request is for invoking a first API of the controller to create a service instance of the service. The first request includes an identifier of the service instance. The service deployment apparatus sends a second request to the controller. The second request is for invoking a second API of the controller to create a first network instance and/or a second network instance. The second request includes information for creating the first network instance and/or information for creating the second network instance. The information for creating the first network instance includes the identifier of the service instance, an identifier of the first network instance, and a device identifier of a first device. The information for creating the second network instance includes the identifier of the service instance, an identifier of the second network instance, and a device identifier of a first cloud PE. The first network instance and the second network instance are for deploying the service. The first network instance is a network instance corresponding to the first device, and the first network instance includes the device identifier of the first device. The second network instance is a network instance corresponding to the first cloud PE, and the second network instance includes the device identifier of the first cloud PE. The first cloud PE is for connecting to the first cloud. The first device and the first cloud PE are edge devices of the virtual cloud private network. The tenant accesses the cloud via the first device and the first cloud PE. Network personnel invoke, by using the service deployment apparatus, a service-oriented interface provided by the controller to perform service deployment, so as to simplify a procedure of deploying a virtual cloud private network service into creating the service instance and creating the first network instance and the second network instance, so that the service deployment is simplified, and efficiency and accuracy of the service deployment are improved.

In an implementation, the first request further includes one or more of the following such as a type of the service instance, an identifier of the tenant, or order information of the tenant.

In an implementation, a device type of the first device is CPE. When the first device is the first CPE, the information for creating the first network instance further includes one or more of the following such as location information of the first CPE, a network side IP address of the first CPE, a tenant side IP address of the first CPE, or routing information from the first CPE to a local area network of the tenant.

In an implementation, a device type of the first device is a cloud PE. A second cloud PE is for connecting to a second cloud. When the first device is the second cloud PE, the information for creating the first network instance further includes one or more of the following such as location information of the second cloud PE, provider information of the second cloud, an IP address of the second cloud PE for connecting to the second cloud, routing information of the second cloud PE for connecting to the second cloud, or interface quality of service information of the second cloud PE for connecting to the second cloud.

In an implementation, the information for creating the second network instance includes one or more of the following such as the location information of the first cloud PE, provider information of the first cloud, an IP address of the first cloud PE for connecting to the first cloud, routing information of the first cloud PE for connecting to the first cloud, or interface quality of service information of the first cloud PE for connecting to the first cloud. In an implementation, the service deployment apparatus sends a third request to the controller. The third request is used by the service deployment apparatus to invoke a third API of the controller to deploy the first network instance and/or the second network instance. The third request includes information for deploying the first network instance and/or information for deploying the second network instance. The information for deploying the first network instance includes the identifier of the service instance and the identifier of the first network instance. The information for deploying the second network instance includes the identifier of the service instance and the identifier of the second network instance.

In an implementation, the service deployment apparatus receives creation result information, sent by the controller, of the service instance. The creation result information of the service instance includes but is not limited to the identifier of the service instance, a creation success flag of the service instance, a creation failure flag of the service instance, or a creation failure cause of the service instance.

In an implementation, the service deployment apparatus outputs the creation result information of the service instance.

In an implementation, the service deployment apparatus receives creation result information of the first network instance and/or creation result information of the second network instance that are/is sent by the controller. The creation result information of the first network instance includes but is not limited to the identifier of the first network instance, a creation success flag of the first network instance, a creation failure flag of the first network instance, or a creation failure cause of the first network instance. The creation result information of the second network instance includes but is not limited to the identifier of the second network instance, a creation success flag of the second network instance, a creation failure flag of the second network instance, or a creation failure cause of the second network instance.

In an implementation, the service deployment apparatus outputs the creation result information of the first network instance and/or the creation result information of the second network instance.

In an implementation, the service deployment apparatus receives deployment result information of the first network instance and/or deployment result information of the second network instance that are/is sent by the controller. The deployment result information of the first network instance includes but is not limited to the identifier of the first network instance, a deployment success flag of the first network instance, a deployment failure flag of the first network instance, or a deployment failure cause of the first network instance. The deployment result information of the second network instance includes but is not limited to the identifier of the second network instance, a deployment success flag of the second network instance, a deployment failure flag of the second network instance, or a deployment failure cause of the second network instance.

In an implementation, the service deployment apparatus outputs the deployment result information of the first network instance and/or the deployment result information of the second network instance.

In an implementation, the type of the service instance includes single cloud or multi cloud. The single cloud means that the tenant is capable of accessing only one cloud via the first device. The multi cloud means that the tenant is capable of accessing a plurality of clouds via the first device.

In an implementation, the virtual cloud private network is used by at least one site of the tenant to access the first cloud via at least one virtual private line.

In an implementation, the first cloud includes at least one VPC.

In an implementation, a type of each of the at least one site of the tenant includes a branch network or a cloud.

According to a third aspect, an embodiment of this application provides an apparatus for deploying a service. The service is to provide a virtual cloud private network for a tenant, and the virtual cloud private network is used by the tenant to access a first cloud. The apparatus includes a service instance creating module, configured to create a service instance corresponding to the service. The apparatus includes a network instance creating module, configured to create a first network instance and a second network instance in the service instance. The first network instance and the second network instance are for deploying the service. The first network instance is a network instance corresponding to a first device, and the first network instance includes a device identifier of the first device. The device identifier of the first device includes but is not limited to an ESN of the first device, a device name of the first device, or a MAC address of the first device. The second network instance is a network instance corresponding to a first cloud PE, and the second network instance includes a device identifier of the first cloud PE. The device identifier of the first cloud PE includes but is not limited to an ESN of the first cloud PE, a device name of the first cloud PE, or a media access control MAC address of the first cloud PE. The first cloud PE is for connecting to the first cloud. The first device and the first cloud PE are edge devices of the virtual cloud private network. The tenant accesses the cloud via the first device and the first cloud PE. By using the foregoing apparatus, the service is deployed in the virtual cloud private network, so that a procedure of service deployment can be simplified into creating the service instance and creating the first network instance and the second network instance. In an example, the service deployment is simplified, and efficiency and accuracy of the service deployment are improved.

In an implementation, the apparatus further includes an information setting module, configured to set connection information of the first cloud PE for connecting to the first cloud. The connection information includes one or more of the following such as the device identifier of the first cloud PE, location information of the first cloud PE, an identifier of a first interface of the first cloud PE, or an identifier of a first VLAN of the first cloud PE. The first interface is used by the first cloud PE to connect to the first cloud. The first VLAN is used by the first cloud PE to connect to the first cloud. The connection information of the first cloud PE is set in the apparatus, so that when the service instance or the second network instance is created, information such as the device identifier of the first cloud PE and the like can be obtained through association based on one or more pieces of information in the connection information. In an example, a quantity of times of setting a network parameter in the service deployment process is reduced, and the efficiency of the service deployment is further improved. In an implementation, the service instance includes an identifier of the service instance. The identifier of the service instance includes but is not limited to information that can identify the service instance, such as a name of the service instance, an ID of the service instance, or the like.

In an implementation, the service instance further includes one or more of the following such as a type of the service instance, a quantity of created network instances, or order information of the tenant.

In an implementation, the type of the service instance includes single cloud or multi cloud. The single cloud means that the tenant is capable of accessing only one cloud via the first device. The multi cloud means that the tenant is capable of accessing a plurality of clouds via the first device.

In an implementation, a device type of the first device is CPE. When the first device is first CPE, the first network instance further includes one or more of the following such as location information of the first CPE, a network side IP address of the first CPE, a tenant side IP address of the first CPE, or routing information from the first CPE to a local area network of the tenant.

In an implementation, a device type of the first device is a cloud PE. A second cloud PE is for connecting to a second cloud. When the first device is the second cloud PE, the first network instance further includes one or more of the following such as location information of the second cloud PE, provider information of the second cloud, an IP address of the second cloud PE for connecting to the second cloud, routing information of the second cloud PE for connecting to the second cloud, or interface quality of service information of the second cloud PE for connecting to the second cloud.

In an implementation, the second network instance further includes one or more of the following such as the location information of the first cloud PE, provider information of the first cloud, an IP address of the first cloud PE for connecting to the first cloud, routing information of the first cloud PE for connecting to the first cloud, or interface quality of service information of the first cloud PE for connecting to the first cloud.

In an implementation, the network instance creating module is further configured to determine the device identifier of the first cloud PE based on the location information of the first cloud PE and the connection information of the first cloud PE for connecting to the first cloud.

In an implementation, the apparatus further includes a network instance deployment module, configured to deploy the first network instance and the second network instance. By using the apparatus, the procedure of deploying a virtual cloud private network service is simplified into creating the service instance on the controller creating the first network instance and the second network instance, and deploying the first network instance and the second network instance. By using the apparatus, the procedure of service deployment is further simplified, the service deployment is simplified, and the efficiency and the accuracy of the service deployment are improved.

In an implementation, the network instance deployment module is further configured to send first configuration information to the first device, where the first configuration information is for configuring the service; and send second configuration information to the first cloud PE, where the second configuration information is for configuring the service.

In an implementation, the network instance deployment module is further configured to determine the first configuration information and the second configuration information based on the first network instance, the second network instance, and a first service template. The first service template indicates configuration information of the service instance. The configuration information of the service instance includes one or more of the following such as tunnel configuration information, VPN instance configuration information, or routing information.

In an implementation, the information setting module is further configured to set the first service template based on the type of the service instance. Before deploying the first network instance and the second network instance, the apparatus sets the first service template based on the type of the service instance. An objective of setting the first service template is to perform template-based configuration on a service corresponding to the service instance in terms of configuration information such as tunnel configuration, VPN instance configuration, routing configuration, and the like. In a service deployment process, a service instance of each type corresponds to one service template. Configuration information of the service instance can be quickly obtained based on the service template, avoiding that network operation and maintenance personnel need to set a large amount of configuration information for each service during service deployment. The method of obtaining the configuration information using the service template simplifies a procedure of obtaining the configuration information during deployment of the virtual cloud private network service, and further improves the efficiency of the service deployment. In an implementation, the virtual cloud private network is further used by the tenant to access a third cloud. The network instance creating module is further configured to create a third network instance in the service instance. The third network instance is a network instance corresponding to a third cloud PE, and the third network instance includes a device identifier of the third cloud PE. The third cloud PE is for connecting to the third cloud.

In an implementation, the apparatus further includes a request message processing module, configured to receive a first request sent by a service deployment apparatus. The first request is for invoking a first API of the apparatus to create the service instance, and the first request includes the identifier of the service instance.

In an implementation, the first request further includes one or more of the following such as the type of the service instance, an identifier of the tenant, or the order information of the tenant.

In an implementation, the request message processing module is further configured to receive a second request sent by the service deployment apparatus. The second request is for invoking a second API of the apparatus to create the first network instance and/or the second network instance. The second request includes information for creating the first network instance and/or information for creating the second network instance. The information for creating the first network instance includes the identifier of the service instance, an identifier of the first network instance, and the device identifier of the first device. The information for creating the second network instance includes the identifier of the service instance, an identifier of the second network instance, and the device identifier of the first cloud PE.

In an implementation, the device type of the first device is the CPE. When the first device is the first CPE, the information for creating the first network instance further includes one or more of the following such as the location information of the first CPE, the network side IP address of the first CPE, the tenant side IP address of the first CPE, or the routing information from the first CPE to the local area network of the tenant.

In an implementation, the device type of the first device is the cloud PE. The second cloud PE is for connecting to the second cloud. When the first device is the second cloud PE, the information for creating the first network instance further includes one or more of the following such as the location information of the second cloud PE, the provider information of the second cloud, the IP address of the second cloud PE for connecting to the second cloud, the routing information of the second cloud PE for connecting to the second cloud, or the interface quality of service information of the second cloud PE for connecting to the second cloud.

In an implementation, the information for creating the second network instance includes one or more of the following such as the location information of the first cloud PE, the provider information of the first cloud, the IP address of the first cloud PE for connecting to the first cloud, the routing information of the first cloud PE for connecting to the first cloud, or the interface quality of service information of the first cloud PE for connecting to the first cloud. In an implementation, the request message processing module is further configured to receive a third request sent by the service deployment apparatus. The third request is for invoking a third API of the apparatus to deploy the first network instance and/or the second network instance. The third request includes information for deploying the first network instance and/or information for deploying the second network instance. The information for deploying the first network instance includes the identifier of the service instance and the identifier of the first network instance. The information for deploying the second network instance includes the identifier of the service instance and the identifier of the second network instance.

In an implementation, the request message processing module is further configured to receive a fourth request sent by the service deployment apparatus. The fourth request is for invoking a fourth API of the apparatus to obtain deployment result information of the first network instance and/or deployment result information of the second network instance. The deployment result information of the first network instance includes but is not limited to the identifier of the first network instance, a deployment success flag of the first network instance, a deployment failure flag of the first network instance, or a deployment failure cause of the first network instance. The deployment result information of the second network instance includes but is not limited to the identifier of the second network instance, a deployment success flag of the second network instance, a deployment failure flag of the second network instance, or a deployment failure cause of the second network instance.

In an implementation, the apparatus further includes a result information processing module, configured to send the deployment result information of the first network instance and/or the deployment result information of the second network instance to the service deployment apparatus.

In an implementation, the result information processing module is configured to send creation result information of the service instance to the service deployment apparatus. The creation result information of the service instance includes but is not limited to the identifier of the service instance, a creation success flag of the service instance, a creation failure flag of the service instance, or a creation failure cause of the service instance.

In an implementation, the result information processing module is configured to receive a fifth request sent by the service deployment apparatus. The fifth request is for invoking a fifth API of the controller to obtain the creation result information of the service instance.

In an implementation, the result information processing module is configured to send creation result information of the first network instance and/or creation result information of the second network instance to the service deployment apparatus. The creation result information of the first network instance includes but is not limited to the identifier of the first network instance, a creation success flag of the first network instance, a creation failure flag of the first network instance, or a creation failure cause of the first network instance. The creation result information of the second network instance includes but is not limited to the identifier of the second network instance, a creation success flag of the second network instance, a creation failure flag of the second network instance, or a creation failure cause of the second network instance.

In an implementation, the result information processing module is configured to receive a sixth request sent by the service deployment apparatus. The sixth request is for invoking a sixth API of the controller to obtain the creation result information of the first network instance and/or the creation result information of the second network instance.

In an implementation, the virtual cloud private network is used by at least one site of the tenant to access the first cloud via at least one virtual private line.

In an implementation, the first cloud includes at least one VPC.

In an implementation, a type of each of the at least one site of the tenant includes a branch network or a cloud.

According to a fourth aspect, an embodiment of this application provides an apparatus for deploying a service. The service is to provide a virtual cloud private network for a tenant, and the virtual cloud private network is used by the tenant to access a first cloud. The apparatus includes a request message processing module, configured to send a first request to a controller. The first request is for invoking a first API of the controller to create a service instance of the service. The first request includes an identifier of the service instance. The request message processing module is further configured to send a second request to the controller. The second request is for invoking a second API of the controller to create a first network instance and/or a second network instance. The second request includes information for creating the first network instance and/or information for creating the second network instance. The information for creating the first network instance includes the identifier of the service instance, an identifier of the first network instance, and a device identifier of a first device. The information for creating the second network instance includes the identifier of the service instance, an identifier of the second network instance, and a device identifier of a first cloud PE. The first network instance and the second network instance are for deploying the service. The first network instance is a network instance corresponding to the first device. The first network instance includes the device identifier of the first device. The second network instance is a network instance corresponding to the first cloud PE, and the second network instance includes the device identifier of the first cloud PE. The first cloud PE is for connecting to the first cloud. The first device and the first cloud PE are edge devices of the virtual cloud private network. The tenant accesses the cloud via the first device and the first cloud PE. By using the foregoing apparatus, service deployment is performed by invoking a service-oriented interface provided by the controller, to simplify a procedure of deploying a virtual cloud private network service into creating the service instance, the first network instance, and the second network instance, so that the service deployment is simplified, and efficiency and accuracy of the service deployment are improved.

In an implementation, the first request further includes one or more of the following such as a type of the service instance, an identifier of the tenant, or order information of the tenant.

In an implementation, a device type of the first device is CPE. When the first device is first CPE, the information for creating the first network instance further includes one or more of the following such as location information of the first CPE, a network side IP address of the first CPE, a tenant side IP address of the first CPE, or routing information from the first CPE to a local area network of the tenant.

In an implementation, a device type of the first device is a cloud PE. A second cloud PE is for connecting to a second cloud. When the first device is the second cloud PE, the information for creating the first network instance further includes one or more of the following such as location information of the second cloud PE, provider information of the second cloud, an IP address of the second cloud PE for connecting to the second cloud, routing information of the second cloud PE for connecting to the second cloud, or interface quality of service information of the second cloud PE for connecting to the second cloud.

In an implementation, the information for creating the second network instance includes one or more of the following such as the location information of the first cloud PE, provider information of the first cloud, an IP address of the first cloud PE for connecting to the first cloud, routing information of the first cloud PE for connecting to the first cloud, or interface quality of service information of the first cloud PE for connecting to the first cloud.

In an implementation, the request message processing module is further configured to send, to the controller, a third request for invoking a third API of the controller to deploy the first network instance and/or the second network instance. The third request includes information for deploying the first network instance and/or information for deploying the second network instance. The information for deploying the first network instance includes the identifier of the service instance and the identifier of the first network instance. The information for deploying the second network instance includes the identifier of the service instance and the identifier of the second network instance.

In an implementation, the apparatus further includes a result information processing module, configured to receive creation result information, sent by the controller, of the service instance. The creation result information of the service instance includes but is not limited to the identifier of the service instance, a creation success flag of the service instance, a creation failure flag of the service instance, or a creation failure cause of the service instance.

In an implementation, the result information processing module is further configured to output the creation result information of the service instance.

In an implementation, the result information processing module is further configured to receive creation result information of the first network instance and/or creation result information of the second network instance that are/is sent by the controller. The creation result information of the first network instance includes but is not limited to the identifier of the first network instance, a creation success flag of the first network instance, a creation failure flag of the first network instance, or a creation failure cause of the first network instance. The creation result information of the second network instance includes but is not limited to the identifier of the second network instance, a creation success flag of the second network instance, a creation failure flag of the second network instance, or a creation failure cause of the second network instance.

In an implementation, the result information processing module is further configured to output the creation result information of the first network instance and/or the creation result information of the second network instance. In an implementation, the result information processing module is further configured to receive deployment result information of the first network instance and/or deployment result information of the second network instance that are/is sent by the controller. The deployment result information of the first network instance includes but is not limited to the identifier of the first network instance, a deployment success flag of the first network instance, a deployment failure flag of the first network instance, or a deployment failure cause of the first network instance. The deployment result information of the second network instance includes but is not limited to the identifier of the second network instance, a deployment success flag of the second network instance, a deployment failure flag of the second network instance, or a deployment failure cause of the second network instance. In an implementation, the result information processing module is further configured to output the deployment result information of the first network instance and/or the deployment result information of the second network instance.

In an implementation, the type of the service instance includes single cloud or multi cloud. The single cloud means that the tenant is capable of accessing only one cloud via the first device. The multi cloud means that the tenant is capable of accessing a plurality of clouds via the first device.

In an implementation, the virtual cloud private network is used by at least one site of the tenant to access the first cloud via at least one virtual private line.

In an implementation, the first cloud includes at least one VPC.

In an implementation, a type of each of the at least one site of the tenant includes a branch network or a cloud.

According to a fifth aspect, an embodiment of this application provides a system for deploying a service. The system includes a controller and a service deployment apparatus. The controller implements the steps performed by the controller in the methods in the foregoing aspects, and the service deployment apparatus implements the steps performed by the service deployment apparatus in the methods in the foregoing aspects.

According to a sixth aspect, an embodiment of this application provides a communication apparatus. The communication apparatus includes a memory and a processor, and the memory includes instructions. When the processor executes the instructions, the communication apparatus is enabled to perform the steps performed by the controller in the methods in the foregoing aspects.

According to a seventh aspect, an embodiment of this application provides a communication apparatus. The communication apparatus includes a memory and a processor, and the memory includes instructions. When the processor executes the instructions, the communication apparatus is enabled to perform the steps performed by the service deployment apparatus in the methods in the foregoing aspects.

According to an eighth aspect, an embodiment of this application provides a computer-readable storage medium. The computer-readable storage medium stores instructions, and when the instructions are executed by a processor, the method for deploying a service provided in any one of the foregoing aspects is implemented.

According to a ninth aspect, an embodiment of this application provides a computer program product including instructions. When the computer program product is executed by a processor, the method for deploying a service provided in any one of the foregoing aspects and any possible implementation is implemented.

BRIEF DESCRIPTION OF DRAWINGS

FIG. 5B is a schematic diagram of an interface of a service instance list in an embodiment of a method for deploying a service according to an embodiment of this application;

FIG. 6A is a schematic diagram of an interface for creating a network instance in an embodiment of a method for deploying a service according to an embodiment of this application;

FIG. 6C is a schematic diagram of an interface for creating a network instance in an embodiment of a method for deploying a service according to an embodiment of this application;

DESCRIPTION OF EMBODIMENTS

To make the objectives, technical solutions, and advantages of this application clearer, the following further describes this application in detail with reference to the accompanying drawings. It is clear that the described embodiments are merely some rather than all of embodiments of this application.

Network architectures and service scenarios described in embodiments of this application are used as examples to describe the technical solutions of this application, but this does not mean that this application is applicable only to the following embodiments. A person of ordinary skill in the art may know that, with evolution of network architectures and emergence of new service scenarios, the technical solutions provided this application are also applicable to a similar technical problem.

Terms included in this application are described below.

Virtual cloud private network: The virtual cloud private network is a virtual private network dedicated for a tenant or an enterprise user to access a cloud. For example, a terminal or a server in a tenant site can access a cloud via the virtual cloud private network. A service provider establishes one or more virtual private lines between a network device on the tenant site side and a network device on the cloud side, so that the terminal or the server in the tenant site can access the cloud via the private line. In comparison with accessing the cloud by the tenant via Internet, the tenant obtains higher security and reliability when accessing the cloud via the virtual cloud private network.

Tenant site: which is a network of a tenant. A terminal or a server in the network needs to access a cloud via a virtual cloud private network. A type of the tenant site includes but is not limited to a branch network or a cloud.

Service provider network: The service provider network is a network deployed, operated, and maintained by a service provider. The network is infrastructure that provides a virtual cloud private network service for a tenant. The service provider provides, for a service of the tenant based on the network, a virtual private line from a tenant side to a cloud side, so that a terminal or a server in a tenant site can access the cloud via the virtual cloud private network.

Figure 1A:
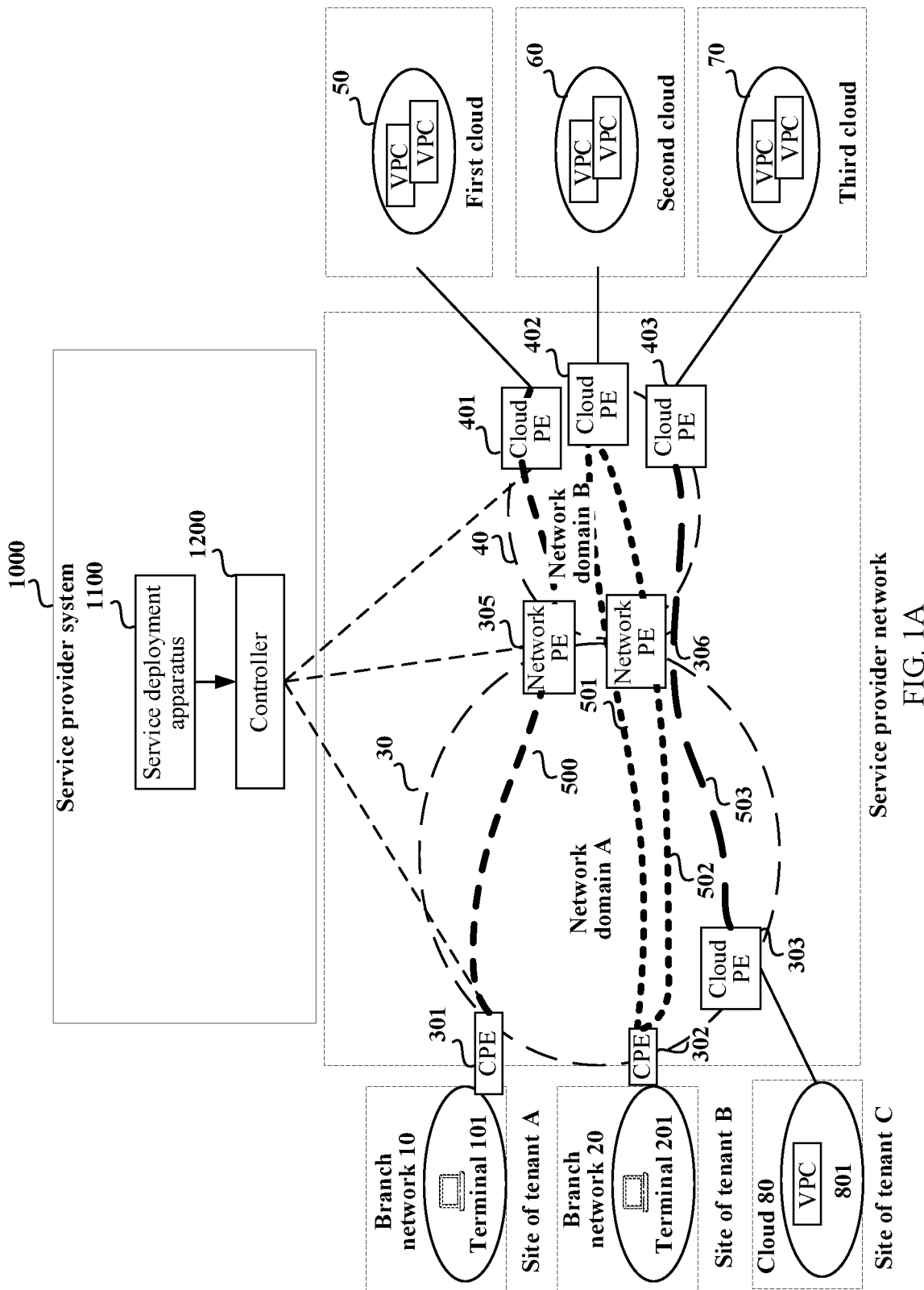
FIG. 1A is a diagram of a network topology and an architecture of a method for deploying a service according to an embodiment of this application.
Figure 1B:
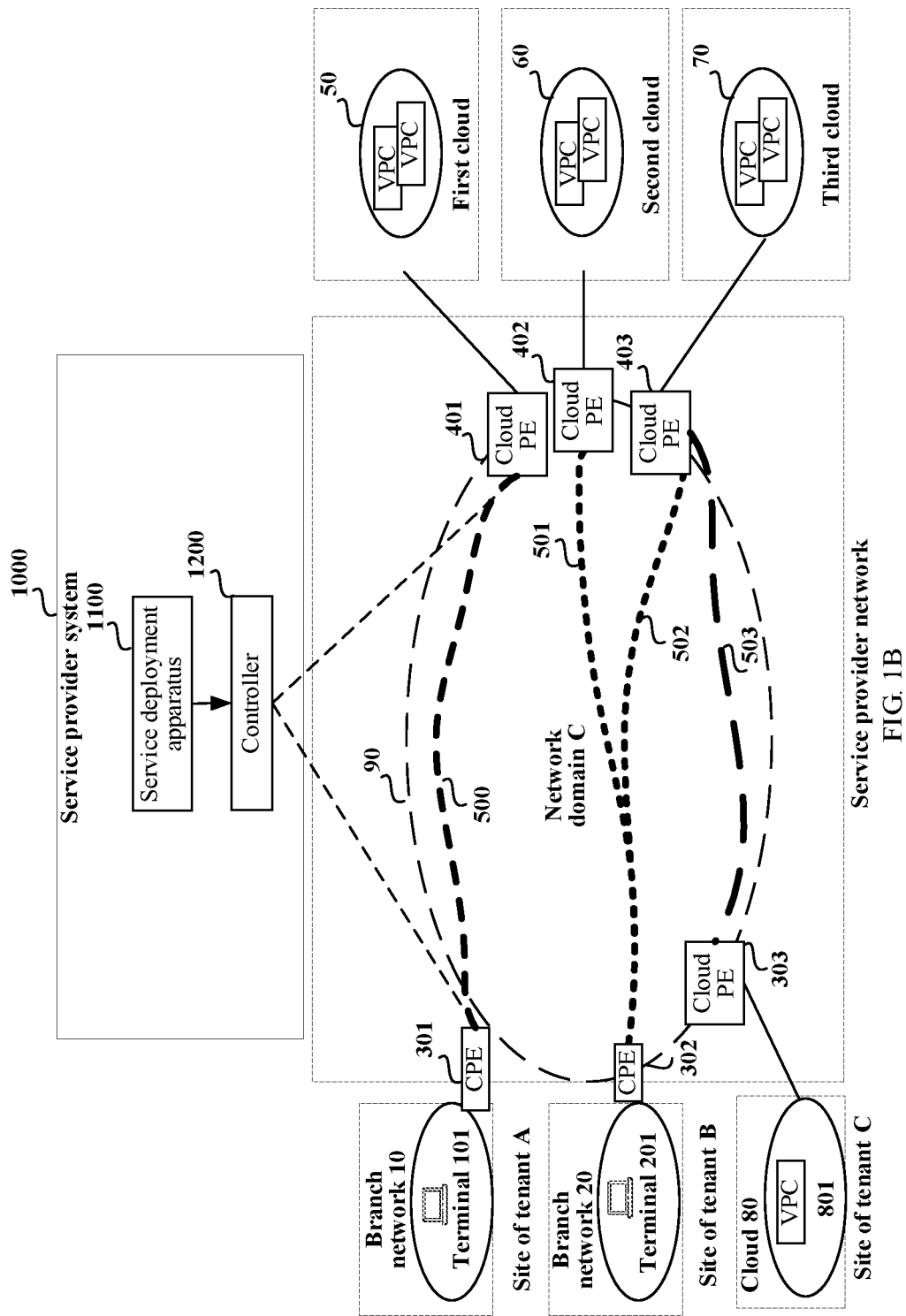
FIG. 1B is a diagram of a network topology and an architecture of a method for deploying a service according to an embodiment of this application.

In schematic diagrams of application scenarios shown in FIG. 1A and FIG. 1B, a network topology and a system architecture of a service provider system, a tenant site, a service provider network, and a cloud of a service provider of a virtual cloud private network in embodiments are described. As shown in FIG. 1A and FIG. 1B, a service provider provides a virtual cloud private network service for tenant A, tenant B, and tenant C by using a service provider system 1000. The service provider provides an accessible cloud for the tenants, and the cloud includes a first cloud 50, a second cloud 60, and a third cloud 70. A type of the cloud includes but is not limited to a public cloud, a private cloud, or a hybrid cloud. The cloud accessed by the tenant may be one cloud, or may be one or more VPCs obtained through virtualization based on the cloud by using a virtualization technology.

As shown in FIG. 1A and FIG. 1B, a type of a tenant site of the tenant A is a branch network. The tenant site of the tenant A includes a branch network 10. The branch network 10 includes a terminal 101. A type of a tenant site of the tenant B is a branch network. The tenant site of the tenant B includes a branch network 20. The branch network 20 includes a terminal 201. A type of a tenant site of the tenant C is a cloud. The tenant site of the tenant C includes a cloud 80. The cloud 80 includes a VPC 801.

As shown in FIG. 1A, the service provider network is a multi-domain network, including a network domain A 30 and a network domain B 40. The network domain A includes CPE 301, CPE 302, and a cloud PE 303. The CPE 301 is a network device deployed in the service provider network and located on a site side of the tenant A. The CPE 302 is a network device deployed in the service provider network and located on a site side of the tenant B. The cloud PE 303 is a network device deployed in the service provider network and located on a site side of the tenant C. The network domain A further includes other devices of the service provider, which are not described one by one herein. The network domain B includes a network PE 305, a network PE 306, a cloud PE 401, a cloud PE 402, and a cloud PE 403. The network PE 305 and the network PE 306 are both edge devices deployed in the service provider network and located in the network domain A and the network domain B. The cloud PE 401 is a device deployed in the service provider network and located on a side of the first cloud 50. The cloud PE 402 is a device deployed in the service provider network and located on a side of the second cloud 60. The cloud PE 403 is a device deployed in the service provider network and located on a side of the third cloud 70. The network domain B further includes other devices of the service provider, which are not described one by one herein.

As shown in FIG. 1B, the service provider network is a single-domain network, and is a network including a network domain C 90. The network domain C includes CPE 301, CPE 302, a cloud PE 303, a cloud PE 401, a cloud PE 402, and a cloud PE 403. The CPE 301 is a network device deployed in the service provider network and located on a site side of the tenant A. The CPE 302 is a network device deployed in the service provider network and located on a site side of the tenant B. The cloud PE 303 is a network device deployed in the service provider network and located on a site side of the tenant C. The cloud PE 401 is a device deployed in the service provider network and located on a side of the first cloud 50. The cloud PE 402 is a device deployed in the service provider network and located on a side of the second cloud 60. The cloud PE 403 is a device deployed in the service provider network and located on a side of the third cloud 70. The network domain C further includes other devices of the service provider, which are not described one by one herein.

A service requirement of the tenant A is that the terminal 101 at the site (for example, the branch network 10) of the tenant A accesses only the first cloud 50.

A service requirement of the tenant B is that the terminal 201 at the site (for example, the branch network 20) of the tenant B accesses the second cloud 60 and the third cloud 70.

A service requirement of the tenant C is that a server at the site (for example, the cloud 80) of the tenant C accesses only the third cloud 70.

The service provider classifies a service type of the virtual cloud private network into single cloud and multi cloud based on the service requirements of the tenants. The single cloud means that the tenant is capable of accessing only one cloud via a device on a tenant side. The multi cloud means that the tenant is capable of accessing a plurality of clouds via a device on a tenant side. For example, the service requirement of the tenant A is that the terminal 101 accesses only the first cloud 50 via the CPE 301. In an example, a service type of the tenant A is the single cloud. The service requirement of the tenant C is that the server accesses only the third cloud 70 via the cloud PE 303. In an example, a service type of the tenant C is the single cloud. For another example, the service requirement of the tenant B is that the terminal can access the second cloud 60 and the third cloud 70 via the CPE 302. In an example, a service type of the tenant B is the multi cloud.

As shown in FIG. 1A and FIG. 1B, the service provider system 1000 is a system for deploying a service provided in an embodiment of this application. The service provider system 1000 includes a service deployment apparatus 1100 and a controller 1200 corresponding to the service provider network. The service deployment apparatus 1100 may be an operations support system (OSS), a business support system, a network services orchestrator (NSO), or the like. As shown in FIG. 1A, the controller 1200 is a cross-domain controller, and is configured to perform management, operation, and maintenance on the network devices in the network domain A 30 and the network domain B 40. As shown in FIG. 1B, the controller 1200 is a single-domain controller, and is configured to perform management, operation, and maintenance on the network devices in the network domain C 90.

As shown in FIG. 1A and FIG. 1B, the service deployment apparatus 1100 deploys a virtual cloud private network service by invoking one or more APIs of the controller 1200.

Figure 2A:
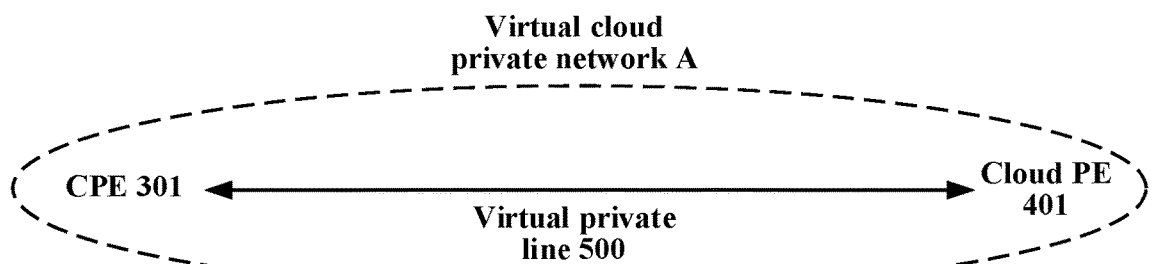
FIG. 2A is a schematic diagram of an application scenario of a method for deploying a service according to an embodiment of this application.

To provide a tenant with a virtual cloud private network that satisfies a service requirement of the tenant, the service provider needs to provide one or more virtual private lines for the tenant. The virtual private line is used by a terminal or a server in a tenant site to access a cloud. The virtual private line is a data transmission tunnel from a network device on a tenant side in the service provider network to a network device on a cloud side. A type of the tunnel includes but is not limited to a layer 2 VPN tunnel or a layer 3 VPN tunnel. As shown in FIG. 2A, the service provider provides a virtual cloud private network A for the tenant A, where a service type of the virtual cloud private network A is single cloud. A virtual private line 500 from the CPE 301 to the cloud PE 401 is created. Based on the virtual private line 500, a data forwarding procedure of a data packet that is from the terminal 101 at the site of the tenant A and that is for accessing the first cloud 50 is as follows.

1. The terminal 101 at the site of the tenant A sends the data packet that is for accessing the first cloud 50, and the data packet is forwarded by a network device in the branch network 10 to the CPE 301.

2. After receiving the packet, the CPE 301 encapsulates the data packet into a tunnel (for example, the virtual private line 500 between the CPE 301 and the cloud PE 401) based on a result obtained by parsing a destination IP address.

3. The cloud PE 401 receives the data packet via the virtual private line 500, decapsulates the data packet, and forwards the data packet to the first cloud 50 based on routing information of a destination IP address network segment.

Figure 2B:
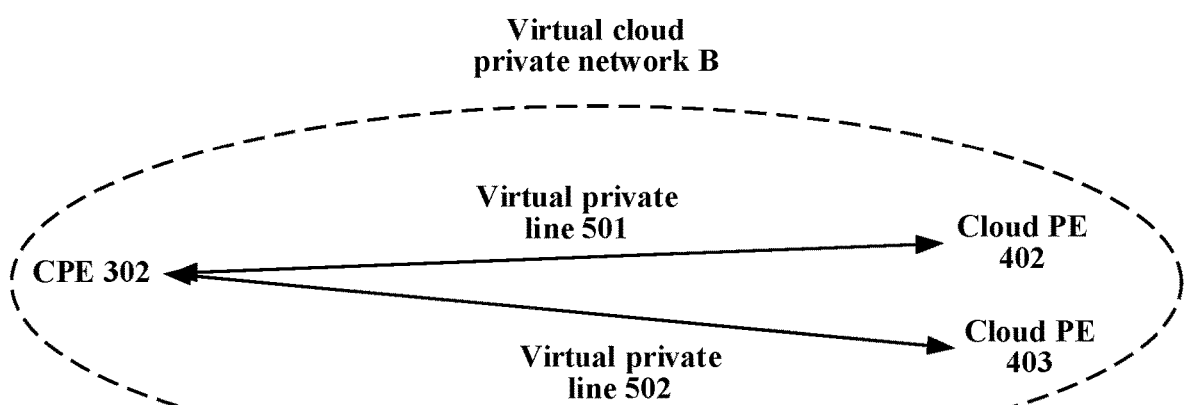
FIG. 2B is a schematic diagram of an application scenario of a method for deploying a service according to an embodiment of this application.
Figure 2C:
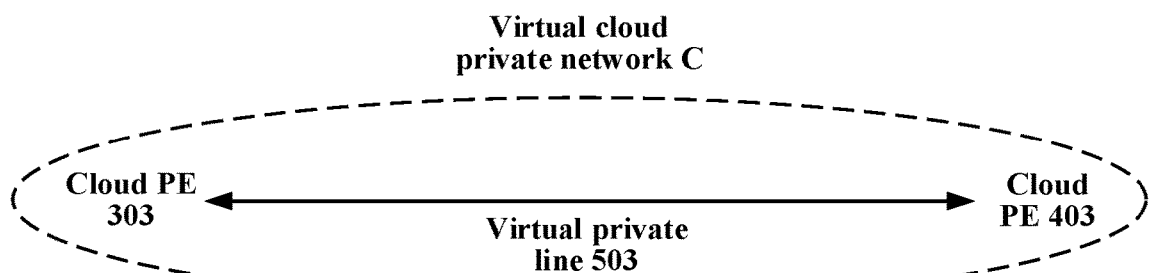
FIG. 2C is a schematic diagram of an application scenario of a method for deploying a service according to an embodiment of this application.

According to the foregoing data packet processing procedure, the terminal 101 at the site of the tenant A may access the first cloud 50. As shown in FIG. 2B, based on the service requirement of the tenant B, the service provider provides a virtual cloud private network B for the tenant B, and creates two virtual private lines, including a virtual private line 501 from the CPE 302 to the cloud PE 402 and a virtual private line 502 from the CPE 302 to the cloud PE 403. As shown in FIG. 2C, based on the service requirement of the tenant C, the service provider provides a virtual cloud private network C for the tenant, and creates a virtual private line 503 from the cloud PE 303 to the cloud PE 403.

If the service provider deploys a foregoing tenant service based on an existing service, an example service deployment process is as follows.

1. When receiving a service requirement of a tenant, network operation and maintenance personnel of the service provider need to first determine device information of a network device deployed on a tenant site side and device information of a cloud PE corresponding to a cloud service purchased by the tenant.

2. View a corresponding device resource, such as interface information of the device or an existing configuration of the device, on a network management system corresponding to the foregoing device.

3. The network operation and maintenance personnel need to view resource information of a network device in a service provider network between the device on the tenant site side and the cloud PE on a cloud side. An objective of viewing is to plan a virtual private line from the device on the tenant site side to the cloud PE.

4. Configure, for a related network device that the planned virtual private line passes through, based on planning information via a command line, a configuration interface of the network management system, or by invoking an API interface of the network management system, tunnel configuration information, VPN instance configuration information, routing information, and the like that correspond to the planned virtual private line.

It can be learned from descriptions of the foregoing procedure that, the network operation and maintenance personnel need to plan a virtual private line based on a service requirement of each tenant, query, identify, and allocate a network inventory resource, and then set configuration information on a related network device. A service deployment procedure is complex and a workload is heavy. Consequently, the service cannot be quickly deployed, and a rollout speed of the tenant service is small.

Embodiments of this application provide a method, an apparatus, and a system for deploying a service. A service instance corresponding to a service is created, and a corresponding network instance is created in the service instance, so that a procedure of service deployment is simplified, complexity of the service deployment is reduced, and efficiency and accuracy of the service deployment are improved.

Figures 3, 4A:
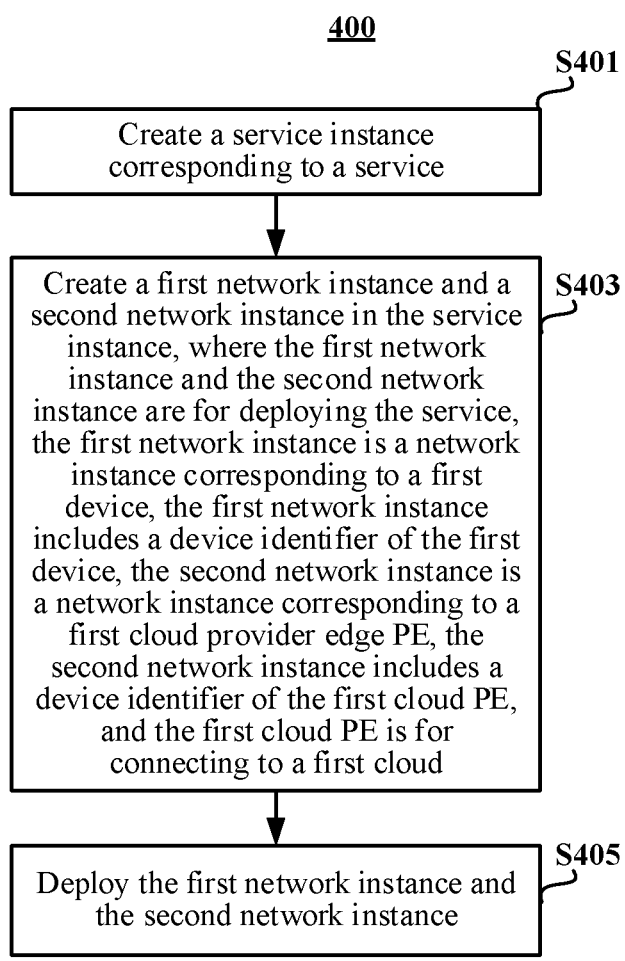
FIG. 3 is a schematic diagram of an interface for setting connection information in an embodiment of a method for deploying a service according to an embodiment of this application.
FIG. 4A is a flowchart of an implementation of a method for deploying a service according to an embodiment of this application.

FIG. 4A is a schematic flowchart of a method 400 for deploying a service according to an embodiment of this application. A network architecture to which the method 400 is applied includes a controller, a service deployment apparatus, a first device, and a first cloud PE. The network architecture to which the method 400 is applied may be, for example, the network architecture shown in FIG. 1A or FIG. 1B. In this case, the controller may be, for example, the controller 1200 shown in FIG. 1A or FIG. 1B, the service deployment apparatus may be, for example, the service deployment apparatus 1100 shown in FIG. 1A or FIG. 1B, and the first device may be, for example, the CPE 301 or the CPE 302 shown in FIG. 1A or FIG. 1B. The first device may alternatively be, for example, the cloud PE 303 shown in FIG. 1A or FIG. 1B. The first cloud PE is, for example, the cloud PE 401, the cloud PE 402, or the cloud PE 403 shown in FIG. 1A or FIG. 1B. The method 400 is performed by the controller, and includes the following steps.

S401: Create a service instance corresponding to a service.

The controller creates the service instance corresponding to the service. In some embodiments, when a service provider receives a service requirement of a tenant on a virtual cloud private network, network operation and maintenance personnel create the service instance in the controller based on the service requirement. The service instance includes an identifier of the service instance. The identifier of the service instance includes but is not limited to a name of the service instance, an identifier (ID) of the service instance, or the like. The service instance further identifies a service type of the virtual cloud private network. The service instance may further include a type of the service instance. The type of the service instance indicates a service type, for example, single cloud or multi cloud. As shown in FIG. 2A, if a corresponding service instance needs to be created for the virtual cloud private network A, a type of the service instance is single cloud. As shown in FIG. 2B, if a corresponding service instance needs to be created for the virtual cloud private network B, a type of the service instance is multi cloud. The service instance may further include tenant information, and the tenant information includes but is not limited to an identifier of the tenant or order information of the tenant. The service instance may further include information about a created network instance. The information about the created network instance includes but is not limited to a quantity of network instances, a type of the network instance, and an identifier of the network instance. The network instance is an instance corresponding to an edge device in the virtual cloud private network. As shown in FIG. 2A, a network instance in the service instance corresponding to the virtual cloud private network A includes but is not limited to a network instance corresponding to the CPE 301 and a network instance corresponding to the cloud PE 401. The quantity of created network instances indicates a quantity of created network instances in the service instance. The type of the network instance identifies a type of a network device corresponding to the network instance. As shown in FIG. 2A to FIG. 2C, a device type of the edge device in the virtual cloud private network includes but is not limited to CPE or a cloud PE. An objective of creating the service instance is to record a to-be-deployed service and provide resource information for the service. In an example, when service deployment is performed in the controller, service information needs to be described and recorded in the controller, and the resource information, for example, information of a network device corresponding to the service, configuration information corresponding to the service, or the like needs to be provided for service deployment based on the service information. The resource information. A process of deploying a virtual cloud private line service is to create a data transmission path from a tenant site side to a cloud side. The data transmission path includes a data transmission tunnel created between a device on the tenant site side and a device on the cloud side in a service provider network. The service instance records service type information, information about the edge node in the virtual cloud private network, and the tenant information corresponding to the service. A virtual cloud private network service is associated with the edge device by using the service instance. In addition, the service is associated with the tenant by using the service instance. The service provider can search for the related service based on the tenant information, to help subsequently query the service. In some embodiments, the service instance is in a one-to-one correspondence with the service that needs to be deployed for the tenant. For example, when the service provider provides a service of the virtual cloud private network A for the tenant A, the service provider needs to create, in the service provider system 1000, a service instance 2000 corresponding to the service of the virtual cloud private network A.

Figure 4B:
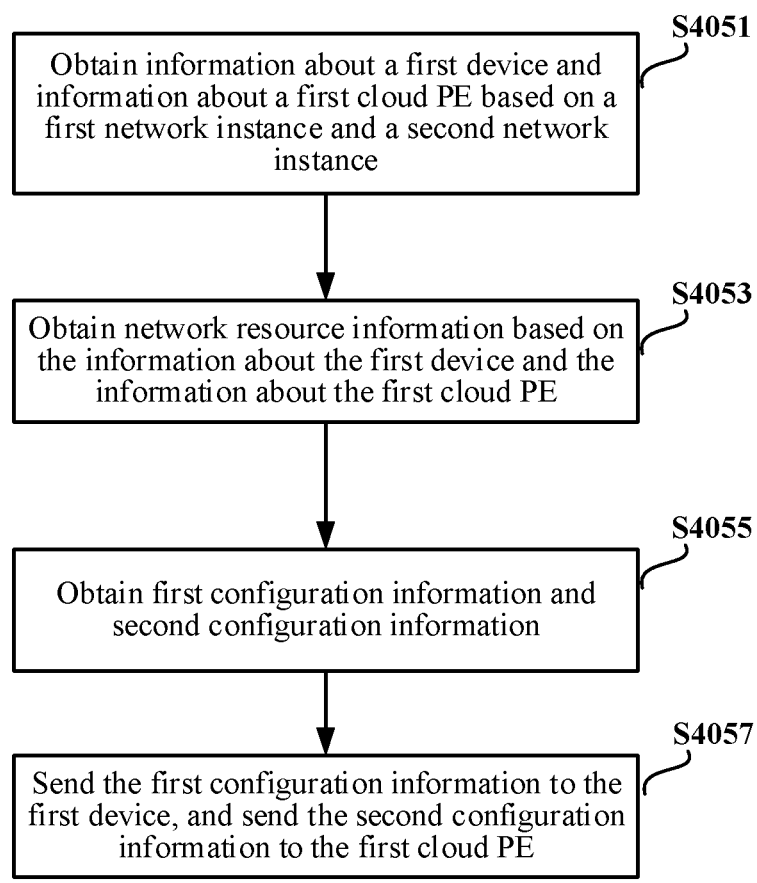
FIG. 4B is a flowchart of an implementation of a method for deploying a service according to an embodiment of this application.
Figures 4C, 5A:
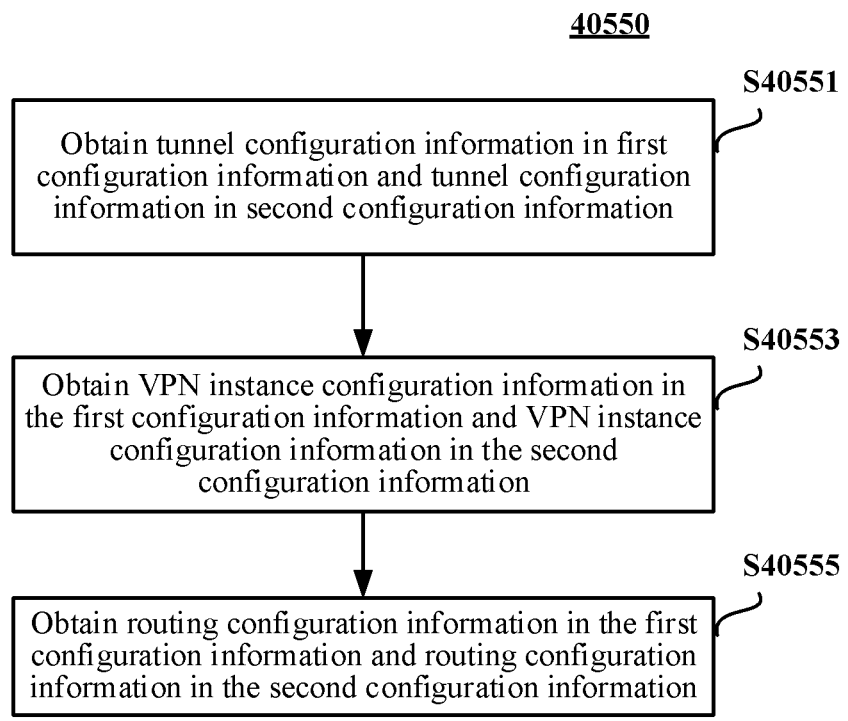
FIG. 4C is a flowchart of an implementation of a method for deploying a service according to an embodiment of this application.
FIG. 5A is a schematic diagram of an interface for creating a service instance in an embodiment of a method for deploying a service according to an embodiment of this application.

In an example, on a service instance creation page shown in FIG. 5A, an input box corresponding to "Service instance identifier" is for obtaining a name or an ID of the service instance, for example, "Virtual cloud private network A". An input box corresponding to "Service instance type" is for obtaining a service type, for example, "Single cloud". An input box corresponding to "Tenant name" is for obtaining a name or an ID of the tenant, for example, "Tenant A". An input box corresponding to "Order information" is for obtaining service order information of the foregoing tenant, for example, an order identifier such as an order number "123456".

S403: Create a first network instance and a second network instance in the service instance, where the first network instance and the second network instance are for deploying the service, the first network instance is a network instance corresponding to the first device, the first network instance includes a device identifier of the first device, the second network instance is a network instance corresponding to the first cloud PE, the second network instance includes a device identifier of the first cloud PE, and the first cloud PE is for connecting to a first cloud.

The controller creates the first network instance and the second network instance in the service instance. The first network instance and the second network instance are for deploying the service. The first network instance is a network instance corresponding to the first device. The second network instance is a network instance corresponding to the first cloud PE. The first device and the first cloud PE are edge devices of the virtual cloud private network. The first device is an edge device connecting a tenant site and the service provider network. The tenant site accesses a virtual private line of the virtual cloud private network via the first device. The first cloud PE is a device connected to the cloud side in the service provider network. The tenant accesses the cloud via the first device and the first cloud PE. The first device is a device on the tenant side in the service provider network. The first network instance is a network instance corresponding to the first device. The first cloud PE is a network device connected to the cloud side. The second network instance is a network instance corresponding to the first cloud PE. The first network instance includes the device identifier of the first device. The second network instance includes the device identifier of the first cloud PE. For example, a service of the virtual cloud private network A relates to a site of the tenant A and the cloud 50, and the service of the virtual cloud private network A corresponds to the service instance 2000. The first device is the CPE 301 in FIG. 2A, and the first network instance is a network instance corresponding to the CPE 301. The first cloud PE is the cloud PE 401, and the second network instance is a network instance corresponding to the cloud PE 401. The controller 1200 creates the first network instance and the second network instance in the service instance 2000. In some other embodiments, a service of the virtual cloud private network C corresponds to a service instance 3000. In this case, the first device is the cloud PE 403 in FIG. 2C, and the first network instance is a network instance corresponding to the cloud PE 403. The first cloud PE is the cloud PE 402, and the second network instance is a network instance corresponding to the cloud PE 402. The controller 1200 creates the first network instance and the second network instance in the service instance 3000.

The first network instance includes the device identifier of the first device, and the second network instance includes the device identifier of the first cloud PE. The device identifier includes but is not limited to identifier information that identifies the device, such as a name of the device, an ESN of the device, an ID of the device, a MAC address of the device, and the like.

As shown in FIG. 2A to FIG. 2C, a device type of the edge device in the virtual cloud private network includes but is not limited to CPE or a cloud PE. In some embodiments, a device type of the first device corresponding to the first network instance is CPE. In other words, a type of the tenant site is a branch network. The service of the tenant A in the virtual cloud private network A in FIG. 2A is used as an example. A service type of the virtual cloud private network A is single cloud. The controller creates the service instance 2000 for the virtual cloud private network A. As shown in FIG. 1A or FIG. 1B, the tenant A accesses only the first cloud 50 via the CPE 301. The first network instance is the network instance corresponding to the CPE 301. The first network instance further includes a name of the first network instance, location information of the CPE 301, a network side IP address of the CPE 301, a tenant side IP address of the CPE 301, and routing information from the CPE 301 to a local area network of the branch network 10 of the tenant A. The network side IP address of the CPE 301 is an IP address of an interface of the CPE 301 to connect to the branch network 10 of the site of the tenant A. The tenant side IP address of the CPE 301 is an IP address of a network device interface of the site that is of the tenant A and that is connected to the CPE 301. The routing information from the CPE 301 to the branch network 10 of the tenant A is for forwarding, from the CPE 301 to the local area network of the site of the tenant A, an access response data packet sent from the first cloud 50. The routing information includes but is not limited to a destination network segment and next hop information.

In an example, FIG. 6A shows an interface for creating the first network instance corresponding to the CPE 301. An input box corresponding to "Network instance name" on the interface is for obtaining a name of the network instance corresponding to the CPE 301. An input box corresponding to "Location information" is for obtaining the location information of the CPE 301, for example, "City A". An input box corresponding to "Device identifier" is for obtaining device identifier information of the CPE 301, for example, an ESN "111222333". An input box corresponding to "Network side IP address" is for obtaining an IP address "10.10.10.10/20" of the interface of the CPE 301 to connect to the site of the tenant. An input box corresponding to "Tenant side IP address" is for obtaining an IP address "10.1.1.1/20" of a network device of the site that is of the tenant and that is connected to the CPE 301. An input box corresponding to "Routing information" is for obtaining the routing information from the CPE 301 to the local area network of the site of the tenant.

The second network instance is the network instance corresponding to the cloud PE 401. The cloud PE 401 is for connecting to the first cloud 50 to be accessed by the tenant A. In this case, the second network instance further includes a name of the second network instance, location information of the cloud PE 401, provider information of the cloud PE 401, an IP address of the cloud PE 401 for connecting to the first cloud 50, an identifier of an interface of the cloud PE 401 for connecting to the first cloud 50, an identifier of a VLAN of the cloud PE 401 for connecting to the first cloud 50, routing information of the cloud PE 401 for connecting to the first cloud 50, or interface quality of service information of the cloud PE 401 for connecting to the first cloud 50. The provider information of the cloud PE 401 includes provider information corresponding to the first cloud 50 connected to the cloud PE 401. The IP address of the cloud PE 401 for connecting to the first cloud 50 is an IP address of the interface of the cloud PE 401 for connecting to the first cloud 50. The routing information of the cloud PE 401 for connecting to the first cloud 50 is routing information for forwarding data from the cloud PE 401 to the first cloud 50, and includes a destination network segment and next hop information. The interface quality of service information of the cloud PE 401 for connecting to the first cloud 50 is for setting quality of service (QoS) information of the interface of the cloud PE 401 for connecting to the first cloud 50, and the QoS information includes but is not limited to a bandwidth, a delay, a jitter, and the like.

In an example, FIG. 6C shows an interface for creating the second network instance corresponding to the cloud PE 401. An input box corresponding to "Network instance name" on the interface is for obtaining the name of the network instance corresponding to the cloud PE 401. An input box corresponding to "Location information" is for obtaining the location information of the cloud PE 401, for example, "City A". A device identifier of the cloud PE 401 may be manually input. Alternatively, the device identifier of the cloud PE 401 may be obtained through association by using the location information of the cloud PE 401 and based on connection information that is of the cloud PE and that is set in the controller 1200. An input box corresponding to "Supplier information" is for obtaining a provider name of the first cloud 50 connected to the cloud PE 401. An input box corresponding to "IP address for a cloud PE to connect to a cloud" is for obtaining an IP address "10.1.2.20/20" of the interface of the cloud PE 401 for connecting to the first cloud 50. An input box corresponding to "VLAN" is for obtaining a VLAN identifier set on the interface of the cloud PE 401 for connecting to the first cloud 50. An input box corresponding to "Interface quality of service information" is for obtaining QoS information set on the interface of the cloud PE 401 for connecting to the first cloud 50. An input box corresponding to "Routing information" is for obtaining routing information from the cloud PE 401 to the first cloud 50.

A process in which the controller sets the connection information of the cloud PE is as follows.

Before the service provider provides services of the virtual cloud private network A, the virtual cloud private network B, and the virtual cloud private network C for the tenant, a network in which the site of the tenant A, the site of the tenant B, and the site of the tenant C can be connected to the first cloud 50 and the second cloud 60, namely, the service provider network shown in FIG. 1A or FIG. 1B, is created in the controller. One or more cloud PEs are deployed in the foregoing service provider network for connecting to one or more clouds in which the service provider can provide a cloud service. For example, the deployed cloud PE 401 is for connecting to the first cloud 50, the deployed cloud PE 402 is for connecting to the second cloud 60, and the deployed cloud PE 403 is for connecting to the third cloud 70. In some embodiments, to manage a correspondence between a cloud PE on the cloud side and a cloud in the service provider network, the connection information of the cloud PE is set in the service provider system.

In some embodiments, the connection information may be set in the controller 1200. In some other embodiments, the connection information may be set in the service deployment apparatus 1100. The connection information that needs to be set includes the device identifier of the cloud PE, location information of the cloud PE, an identifier of an interface of the cloud PE, or an identifier of a VLAN of the cloud PE. The device identifier of the cloud PE includes a device name, a device identifier ID, or the like of the cloud PE. The location information of the cloud PE is a name or an identifier of a location of the cloud connected to the cloud PE. For example, a name of an area location is used as the location information, for example, a city A. For another example, a location identifier corresponding to the cloud is used as the location information, for example, an area B. For another example, an identifier of a service provider that corresponds to the location of the cloud is used, for example, a vendor C-001. The interface of the cloud PE is a physical interface used to connect to the cloud, for example, a physical interface Gigabit Ethernet 1/0/31. The VLAN of the cloud PE indicates that the VLAN needs to be configured on the interface, so that the cloud PE connects to the corresponding cloud via the VLAN.

In an example, FIG. 3 shows a connection information setting interface for setting the connection information of the cloud PE 401 for connecting to the first cloud 50 in this embodiment. In an example, an input box corresponding to "Device name" is for inputting the device identifier of the cloud PE, for example, the cloud PE 401 in FIG. 3. An input box corresponding to "Area information" is for inputting the location information of the cloud PE, for example, the city A in FIG. 3. An input box corresponding to "Interface information" is for inputting the identifier of the interface of the cloud PE, for example, the GE 3/0/1 in FIG. 3. An input box corresponding to "VLAN" is for inputting the identifier of the VLAN of the cloud PE, for example, 100 in FIG. 3. After the foregoing connection information is set, the service provider system 1000 stores and records the connection information of the cloud PE 401 for connecting to the first cloud 50 in the service provider network. By using the foregoing connection information, the device identifier of the cloud PE and other connection information may be obtained through matching by using the location information of the cloud PE. In an example, in a process of creating the second network instance, the network operation and maintenance personnel do not need to enter the device identifier of the first cloud PE on the creation interface, and may obtain the device identifier of the first cloud PE through association by using the location information of the first cloud PE.

Through the foregoing procedure, the controller 1200 creates the first network instance and the second network instance in the service instance 2000. By creating the first network instance and the second network instance, the controller determines information about the edge device in the virtual cloud private network, such as the device identifier, the location information of the device, the routing information, and the like.

In an example, as shown in a service instance list page in FIG. 5B, the controller creates the network instance in the service instance. The page includes information about two service instances, namely, "Virtual cloud private network A" and "Virtual cloud private network B". "Service instance type" of "Virtual cloud private network A" is "Single cloud", "Order information" is "123456", and "Quantity of network instances" is a quantity "2" of created network instances in the service instance of "Virtual cloud private network A".

In some embodiments, as shown in FIG. 2B, a service type of the virtual cloud private network B of the tenant B is multi cloud. The controller creates a service instance 2001 corresponding to a service of the virtual cloud private network B. A first network instance corresponding to the CPE 302, a second network instance corresponding to the cloud PE 401, and a third network instance corresponding to the cloud PE 402 are created in the service instance 2001. The first network instance is a network instance corresponding to the CPE 302. The first network instance further includes a name of the first network instance, location information of the CPE 302, a network side IP address of the CPE 302, a tenant side IP address of the CPE 302, and routing information from the CPE 302 to a local area network of the branch network 20 of the tenant B. The network side IP address of the CPE 302 is an IP address of an interface of the CPE 302 to connect to the branch network 20 of the site of the tenant B. The tenant side IP address of the CPE 302 is an IP address of a network device interface of the site that is of the tenant B and that is connected to the CPE 302. The routing information from the CPE 302 to the local area network of the branch network 20 of the tenant B is routing information for forwarding data from the CPE 302 to the local area network of the site of the tenant B, and includes a destination network segment and next hop information.

The second network instance is the network instance corresponding to the cloud PE 401. The second network instance further includes the name of the second network instance, the location information of the cloud PE 401, the provider information of the cloud PE 401, the IP address of the cloud PE 401 for connecting to the first cloud 50, the identifier of the interface of the cloud PE 401 for connecting to the first cloud 50, the identifier of the VLAN of the cloud PE 401 for connecting to the first cloud 50, the routing information of the cloud PE 401 for connecting to the first cloud 50, or the interface quality of service information of the cloud PE 401 for connecting to the first cloud 50. The third network instance is a network instance corresponding to the cloud PE 402. The third network instance includes a device identifier of the cloud PE 402, a name of the third network instance, location information of the cloud PE 402, provider information of the cloud PE 402, an IP address of the cloud PE 402 for connecting to the second cloud 60, an identifier of an interface of the cloud PE 402 for connecting to the second cloud 60, an identifier of a VLAN of the cloud PE 402 for connecting to the second cloud 60, routing information of the cloud PE 402 for connecting to the second cloud 60, or interface quality of service information of the cloud PE 402 for connecting to the second cloud 60.

The first network instance, the second network instance, and the third network instance are created in the service instance 2001. On the service instance list page shown in FIG. 5B, "Service instance type" of "Virtual cloud private network B" is "Multi cloud", "Order information" is "212345", and "Quantity of network instances" is a quantity "3" of created network instances in the service instance of "Virtual cloud private network B".

Figure 6B:
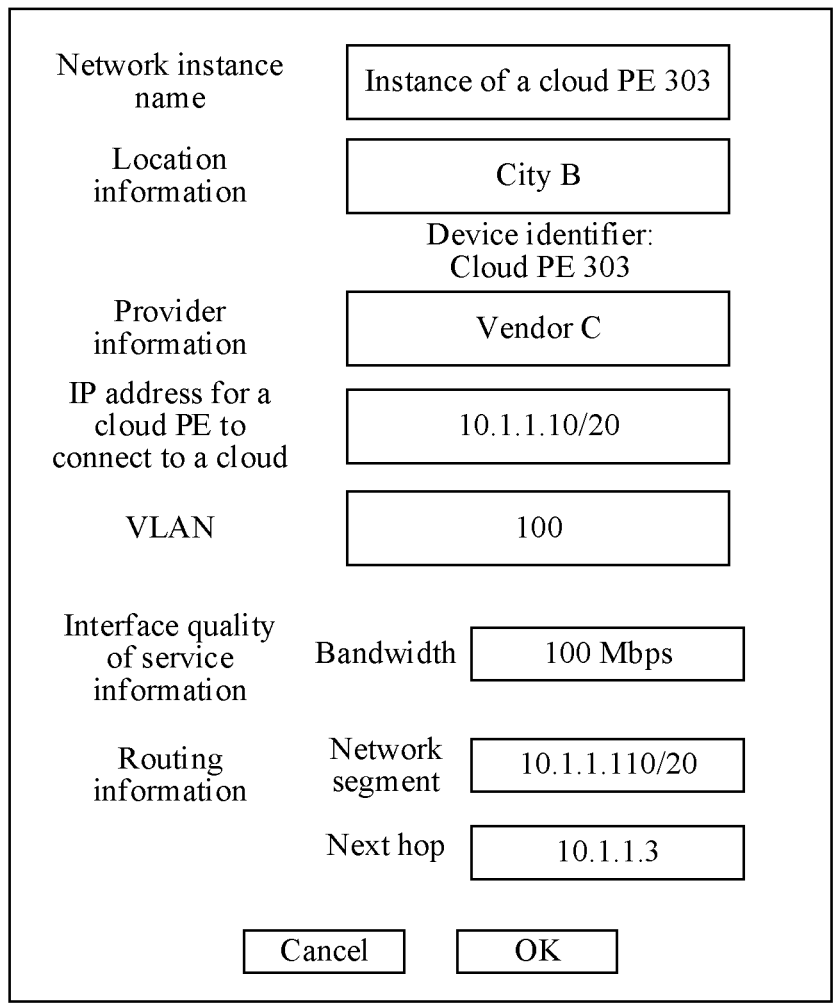
FIG. 6B is a schematic diagram of an interface for creating a network instance in an embodiment of a method for deploying a service according to an embodiment of this application.

In some embodiments, a type of the first device corresponding to the first network instance is a cloud PE. In other words, a type of the tenant site is a cloud. The virtual cloud private network C of the tenant C in FIG. 2C is used as an example. The controller creates a service instance 2002 corresponding to the service of the virtual cloud private network C. The controller creates the first network instance and the second network instance in the service instance 2002. The first device corresponding to the first network instance is the cloud PE 303, and the cloud PE 303 is for connecting to the cloud 80 corresponding to the site of the tenant C. The first network instance further includes a name of the first network instance, location information of the cloud PE 303, provider information of the cloud PE 303, an IP address of the cloud PE 303 for connecting to the cloud 80, an identifier of an interface of the cloud PE 303 for connecting to the cloud 80, an identifier of a VLAN of the cloud PE 303 for connecting to the cloud 80, routing information of the cloud PE 303 for connecting to the first cloud 80, or interface quality of service information of the cloud PE 303 for connecting to the cloud 80. The provider information of the cloud PE 303 includes provider information corresponding to the cloud 80 connected to the cloud PE 303. The IP address of the cloud PE 303 for connecting to the cloud 80 is an IP address of the interface of the cloud PE 303 for connecting to the cloud 80. The routing information of the cloud PE 303 for connecting to the cloud 80 is routing information for forwarding, from the cloud PE 303 to the cloud 80 of the site of the tenant C, response data sent from the third cloud 70, and includes a destination network segment and next hop information. The interface quality of service information of the cloud PE 303 for connecting to the cloud 80 is for setting QoS information of the interface of the cloud PE 303 for connecting to the cloud 80, and includes but is not limited to a bandwidth, a delay, a jitter, and the like. FIG. 6B shows an interface for creating the first network instance corresponding to the cloud PE 303. An input box corresponding to "Network instance name" on the interface is for obtaining the name of the network instance corresponding to the cloud PE 303. An input box corresponding to "Location information" is for obtaining the location information of the cloud PE 303, for example, "City B". The device identifier can be obtained through inputting in the input box. The device identifier of the cloud PE 303 may alternatively be obtained through association by using the location information of the cloud PE 303 and based on the connection information that is of the cloud PE and that is previously set in the controller 1200. An input box corresponding to "Supplier information" is for obtaining a provider name of the cloud 80 connected to the cloud PE 303. An input box corresponding to "IP address for a cloud PE to connect to a cloud" is for obtaining an IP address "10.1.1.10/20" of the interface of the cloud PE 303 for connecting to the cloud 80. An input box corresponding to "VLAN" is for obtaining the identifier that is of the VLAN and that is set on the interface of the cloud PE 303 for connecting to the cloud 80. An input box corresponding to "Interface quality of service information" is for obtaining QoS information set on the interface of the cloud PE 303 for connecting to the cloud 80. An input box corresponding to "Routing information" is for obtaining routing information from the cloud PE 303 to the cloud 80. For the second network instance in the service instance 2002 corresponding to the service of the virtual cloud private network C, a network device corresponding to the second network instance is the cloud PE 403. The first network instance and the second network instance are created in the service instance 2002, so that information for service deployment of the service corresponding to the service instance 2002 in the service provider network, such as the device identifier, the location information, the IP address, the routing information, or the like of the first device on the tenant side and the first cloud PE connected to the cloud side, is created in the controller 1200.

The first network instance and the second network instance are created in the service instance 2002. The service instance list page shown in FIG. 5B includes information about a service instance of "Virtual cloud private network C". "Service instance type" of "Virtual cloud private network C" is "Single cloud", "Order information" is "311222", and "Quantity of network instances" is a quantity "2" of created network instances in the service instance of "Virtual cloud private network C". The controller creates the service instance corresponding to the virtual cloud private network service, and creates the corresponding first network instance and second network instance in the service instance, so that a service deployment procedure is simplified, the service deployment is simplified, and efficiency and accuracy of the service deployment are improved.

S405: Deploy the first network instance and the second network instance.

Optionally, the controller deploys the first network instance and the second network instance. According to the step described in S401 and the step described in S405, the controller has created the service instance corresponding to the service, the first network instance, and the second network instance. The controller has determined the edge device and the service type of the virtual cloud private network corresponding to the to-be-deployed service. The network operation and maintenance personnel need to set tunnel configuration information, VPN instance configuration information, and routing information for the determined first device and first cloud PE based on the service type. A method for setting configuration information for the first device and the first cloud PE includes but is not limited to the following steps.

1. Configure a specific parameter for the first device and the first cloud PE via a tunnel configuration interface in the controller. Configure a specific parameter for the first device and the first cloud PE via a VPN instance configuration interface in the controller. Configure a specific parameter for the first device and the first cloud PE via a routing configuration interface in the controller.

2. Obtain a management IP address of the first device or the first cloud PE by using the controller. Log in, by using the management IP address of the first device or the first cloud PE and a remote login protocol or tool, to a command line interface of the device, to configure the tunnel configuration information, the VPN instance configuration information, and the routing information.

3. The controller sends, to the first device, first configuration information for configuring the service, and sends, to the first cloud PE, second configuration information for configuring the service.

For details of a method 4050 for determining the first configuration information and the second configuration information based on the first network instance and the second network instance, refer to steps shown in FIG. 4B.

S4051: Obtain device information of the first device and device information of the first cloud PE based on the first network instance and the second network instance.

The first device and the first cloud PE are edge devices of the virtual cloud private network. The tenant accesses the cloud via the first device and the first cloud PE. When the type of the tenant site is a branch network, the type of the first device is CPE. The service provider provides the first device for the tenant, and the tenant deploys the first device on a tenant site side. When the type of the tenant site is a cloud, the type of the first device is a cloud PE. The service provider deploys the cloud PE for the tenant in the service provider network.

The first network instance includes information such as the device identifier and the like of the first device, and the second network instance includes information such as the device identifier and the like of the first cloud PE. The controller may determine the device information of the first device and the device information of the first cloud PE based on the first network instance and the second network instance, that is, determine and obtain device information of endpoint devices on the virtual private line. The controller may obtain the device information of the first device through querying in the controller based on the identifier of the first device in the first network instance. The device information of the first device includes but is not limited to the identifier of the first device, a management IP address of the first device, location information of the first device, routing information of the first device, or network resource information of the first device. The network resource information of the first device includes but is not limited to port information of the first device, memory usage information of the first device, CPU usage information of the first device, or effective configuration information of the first device. The information about the first cloud PE includes but is not limited to the identifier of the first cloud PE, a management IP address of the first cloud PE, location information of the first cloud PE, information of the first cloud PE for connecting to a cloud, routing information of the first cloud PE, or network resource information of the first cloud PE. The network resource information of the first cloud PE includes but is not limited to port information of the first cloud PE, memory usage information of the first cloud PE, CPU usage information of the first cloud PE, or effective configuration information of the first cloud PE.

As shown in FIG. 2A, a terminal in a tenant site user network 10 of the tenant A accesses the first cloud via the virtual private line 500, to use the service of the tenant A in the virtual cloud private network A. The service type of virtual cloud private network A is single cloud, that is, the tenant A can access only one cloud. According to the step described in S403, the controller 1200 has created the first network instance corresponding to the CPE 301 and the second network instance corresponding to the cloud PE 401. The controller 1200 obtains device information of the CPE 301 and device information of the cloud PE 401 based on the first network instance and the second network instance.

S4053: Obtain network resource information based on the device information of the first device and the device information of the first cloud PE.

The controller obtains the device information of the first device and the device information of the first cloud PE according to the step described in S4051. The controller may determine, based on network topology information of the service provider network, a network set or a network domain set that the virtual private line passes through. An objective of obtaining the network resource information by the controller is to obtain resource information of a network or a network domain that the virtual private line passes through.

As shown in FIG. 1A, after the controller 1200 obtains the device information of the CPE 301 and the device information of the cloud PE 401 based on the first network instance and the second network instance, the network domain A and the network domain B are passed through between the CPE 301 and the cloud PE 401, and a network domain set is (for example, the network domain A, the network domain B). The controller 1200 obtains network resource information of each network domain in the network domain set. The network resource information includes but is not limited to network topology information of the network domain, device information of each network element in the network domain, information about a network connection between network element devices, and the like. The device information includes but is not limited to a name of the network element device, a type of the network element device, an ESN of the network element device, a management IP address of the network element device, a network location of the network element device, or the like. The information about the network connection includes but is not limited to a physical link and a logical link. A type of the logical link includes but is not limited to a layer 2 VPN tunnel or a layer 3 VPN tunnel. The controller 1200 obtains network resource information of the network domain A. The network resource information includes but is not limited to such as 1. Network topology information of the network domain A; 2. Information about each network element device in the network domain A, where the information about the network element device includes an ESN serial number of the network element device, a type of the network element device, a device model, version information, a management IP address, a MAC address, or the like; 3. Port information of each network element device, including information about a physical port and information about a logical port; or 4. Information about a link between network elements, including physical link information, tunnel information, VPN information, or the like.

S4055: Obtain the first configuration information and the second configuration information.

The controller obtains the device information of the first device, the device information of the first cloud PE, and the network resource information according to the steps described in S4051 and S4053. The controller obtains the first configuration information and the second configuration information based on the foregoing information. The first configuration information is configuration information corresponding to the first device. The first configuration information includes tunnel configuration information, VPN instance configuration information, and routing information that need to be configured by the first device to implement the service. The second configuration information is configuration information corresponding to the first cloud PE. The second configuration information includes tunnel configuration information, VPN instance configuration information, and routing information that need to be configured by the first cloud PE to implement the service. An example of an obtaining step is a method 40550 shown in FIG. 4C.

S40551: Obtain tunnel configuration information in the first configuration information and tunnel configuration information in the second configuration information.

The controller obtains the tunnel configuration information in the first configuration information and the tunnel configuration information in the second configuration information. The tunnel configuration information in the first configuration information and the tunnel configuration information in the second configuration information are for configuring a data transmission tunnel from the first device to the first cloud PE. The tunnel configuration information in the first configuration information is tunnel configuration information that needs to be configured in the first device. The tunnel configuration information in the second configuration information is tunnel configuration information that needs to be configured in the first cloud PE.

In some embodiments, the service provider may define a virtual private line in a single-cloud service as a layer 3 VPN tunnel based on service planning. For example, the virtual private line 500 of the tenant A in the virtual cloud private network A is a layer 3 VPN tunnel. The controller 1200 obtains network resource information such as the network topology information and the like of the network domain A and the network domain B based on the obtained network resource information of the network domain A and the network domain B. The controller 1200 analyzes, based on the foregoing network resource information, whether existing network resource information satisfies establishment of a layer 3 VPN tunnel from the CPE 301 to the cloud PE 401. If an analysis result is that a network resource can satisfy generating of the layer 3 VPN tunnel from the CPE 301 to the cloud PE 401, the controller 1200 provides a configuration interface, and network personnel plan, based on the configuration interface, configuration information that is of the layer 3 VPN tunnel and that needs to be configured in the CPE 301 and the cloud PE 401.

In some other embodiments, the controller 1200 obtains tunnel configuration information of the CPE 301 and the cloud PE 401 based on a service template corresponding to a single-cloud service instance. The service template is set before the service instance is deployed. Before deploying the service instance, the controller sets the service template based on the service type corresponding to the service instance. The service template indicates configuration information of the service. The configuration information of the service includes but is not limited to tunnel configuration information, VPN instance configuration information, or routing information. The service template includes but is not limited to the tunnel configuration information, the VPN instance configuration information, or the routing information. When the service instance is created, the corresponding service template is associated by using the service type. When the controller creates the first network instance and the second network instance in the service instance, because an association relationship has been generated between the service instance and the service template, an association relationship is accordingly generated between the service template and each of the first network instance and the second network instance. The service template includes but is not limited to a sub tunnel service template, a sub VPN instance service template, and a sub routing service template. In an example, the first configuration information and the second configuration information may be determined based on the first network instance, the second network instance, and each sub service template. The controller divides configuration information in the sub tunnel service template and sends the configuration information to the first device and the first cloud PE based on dimensions of the first device and the first cloud PE, and generates the tunnel configuration information in the first configuration information and the tunnel configuration information in the second configuration information.

In this way, the tunnel configuration information corresponding to the first device in the first configuration information and the tunnel configuration information corresponding to the first cloud PE in the second configuration information are obtained. If the analysis result is that establishment of an end-to-end tunnel that carries a layer 3 VPN service cannot be satisfied, an administrator may be prompted to perform an operation such as reselecting a cloud PE, expanding a device capacity, or the like, and then obtain the tunnel configuration information.

S40553: Obtain VPN instance configuration information in the first configuration information and VPN instance configuration information in the second configuration information.

The controller obtains the VPN instance configuration information in the first configuration information and the VPN instance configuration information in the second configuration information. The VPN instance configuration information in the first configuration information and the VPN instance configuration information in the second configuration information are for configuring VPN instances of the first device and the first cloud PE. The VPN instance configuration information in the first configuration information is VPN instance configuration information that needs to be configured in the first device. The VPN instance configuration information in the second configuration information is VPN instance configuration information that needs to be configured in the first cloud PE. In some embodiments, a type of the virtual private line of the tenant A in the virtual cloud private network A is a layer 3 VPN, and configuration information of VPN routing and forwarding (VRF) of the CPE 301 and the cloud PE 401 needs to be obtained. In some other embodiments, the type of the virtual private line of the tenant A in the virtual cloud private network A is a layer 2 VPN, and configuration information of an Ethernet VPN (EVPN) instance (EVI) or a virtual switch instance (VSI) of the CPE 301 and the cloud PE 401 needs to be obtained. The controller 1200 may provide a configuration interface, and network personnel plan, based on the configuration interface, configuration information that is of the VPN instance and that needs to be configured in the CPE 301 and the cloud PE 401.

In embodiments, the controller 1200 obtains VPN configuration information of the CPE 301 and the cloud PE 401 based on a service template corresponding to a single-cloud service instance. The service template is set before the service instance is deployed. Before deploying the service instance, the controller sets the service template based on the service type corresponding to the service instance. The service template indicates configuration information of the service. The configuration information of the service includes but is not limited to tunnel configuration information, VPN instance configuration information, or routing information. The service template includes but is not limited to the tunnel configuration information, the VPN instance configuration information, or the routing information. When the service instance is created, the corresponding service template is associated by using the service type. When the controller creates the first network instance and the second network instance in the service instance, because an association relationship has been generated between the service instance and the service template, an association relationship is also generated between the service template and each of the first network instance and the second network instance. The service template includes but is not limited to a sub tunnel service template, a sub VPN instance service template, and a sub routing service template. In an example, the first configuration information and the second configuration information may be determined based on the first network instance, the second network instance, and each sub service template. The controller divides configuration information in the sub VPN instance service template and sends the configuration information to the first device and the first cloud PE based on dimensions of the first device and the first cloud PE, and generates the VPN instance configuration information in the first configuration information and the VPN instance configuration information in the second configuration information.

S40555: Obtain routing configuration information in the first configuration information and routing configuration information in the second configuration information.

The controller obtains the routing configuration information in the first configuration information and the routing configuration information in the second configuration information. The routing configuration information in the first configuration information and the routing configuration information in the second configuration information are for configuring routing information of the first device and the first cloud PE. The routing information of the first device is used for data forwarding routing from the first device to the tenant site side. The routing information of the first cloud PE is used for data forwarding routing from the first cloud PE to the cloud side. The routing configuration information in the first configuration information is routing configuration information that needs to be configured in the first device. The routing configuration information in the second configuration information is routing configuration information that needs to be configured in the first cloud PE.

The routing configuration information in the first configuration information is for enabling the first device to forward a response data packet from the cloud side to the tenant site. For example, the CPE 301 forwards, to the branch network 10 of the site of the tenant A based on the routing configuration information, a data packet that is from the first cloud 50 and whose destination is the tenant site terminal 101. The routing configuration information in the second configuration information is used by the cloud PE to forward, to the cloud, a data packet that accesses the cloud and that is from the tenant site side. For example, the cloud PE 401 forwards, to the first cloud 50 based on the routing configuration information, a data packet that is from the site of the tenant A and that accesses the first cloud 50. The controller 1200 provides a configuration interface, and network personnel plan, based on the interface, the routing configuration information that needs to be configured in the CPE 301 and the cloud PE 401.

In some embodiments, the controller 1200 obtains routing configuration information of the CPE 301 and the cloud PE 401 based on a service template corresponding to a single-cloud service instance. The service template is set before the service instance is deployed. Before deploying the service instance, the controller sets the service template based on the service type corresponding to the service instance. The service template indicates configuration information of the service. The configuration information of the service includes but is not limited to tunnel configuration information, VPN instance configuration information, or routing information. The service template includes but is not limited to the tunnel configuration information, the VPN instance configuration information, or the routing information. When the service instance is created, the corresponding service template is associated by using the service type. When the controller creates the first network instance and the second network instance in the service instance, because an association relationship has been generated between the service instance and the service template, an association relationship is also generated between the service template and each of the first network instance and the second network instance. The service template includes but is not limited to a sub tunnel service template, a sub VPN instance service template, and a sub routing service template. In an example, the first configuration information and the second configuration information may be determined based on the first network instance, the second network instance, and each sub service template. The controller divides configuration information in the sub routing service template and sends the configuration information to the first device and the first cloud PE based on dimensions of the first device and the first cloud PE, and generates the routing configuration information in the first configuration information and the routing configuration information in the second configuration information.

By performing the steps described in S40551 to S40555, the controller 1200 obtains the first configuration information and the second configuration information.

S4057: Send the first configuration information to the first device, and send the second configuration information to the first cloud PE.

The controller sends the first configuration information to the first device, and sends the second configuration information to the first cloud PE.

A status of the first device or the first cloud PE includes being controlled by the controller or being not controlled by the controller. When a device is controlled by the controller, the controller can perform a management, operation, and maintenance operation such as configuration management, device status querying, or the like on the device. When a device is not controlled by the controller, the controller cannot obtain information about the device, and cannot manage a configuration of the device.

In some embodiments, when the controller learns, through querying, that both the first device and the first cloud PE are in a controlled state, that is, the controller may send the configuration information to the first device and the first cloud PE, after the controller receives a message for deploying the network instance, the controller sends the first configuration information to the first device, and sends the second configuration information to the first cloud PE. The controller may send the configuration information using a Simple Network Management Protocol (SNMP), a Teletype Over Network Protocol (Telnet), Network Configuration Protocol (NETCONF), a private configuration protocol that is based on User Datagram Protocol (UDP)/Transmission Control Protocol (TCP), or the like. When the first device and the first cloud PE receive and validate the first configuration information and the second configuration information, as shown in FIG. 1A or FIG. 1B, the CPE 301 on the site side of the tenant A and the cloud PE 401 on a side of the first cloud 50 validate the first configuration information and the second configuration information, the virtual private line 500 is established between the CPE 301 and the cloud PE 401, to connect the branch network 10 of the site of the tenant A and the first cloud 50.

It should be noted that, when the status of the first device or the first cloud PE is being not controlled by the controller, the first device or the first cloud PE cannot be operated and maintained by the controller, and cannot receive and validate the first configuration information or the second configuration information. The controller pre-stores the configuration information, waits until the first device or the first cloud PE completes a controlling online process, and sends the first configuration information or the second configuration information to the first device or the first cloud PE, to complete deploying the first network instance or the second network instance.

The controller automatically obtains, based on the first network instance, the second network instance, and the preset information, the first configuration information corresponding to the first device and the second configuration information corresponding to the first cloud PE, and the controller delivers the first configuration information and the second configuration information, so that complexity of manual configuration is reduced, and the efficiency of the service deployment is improved.

Figure 7:
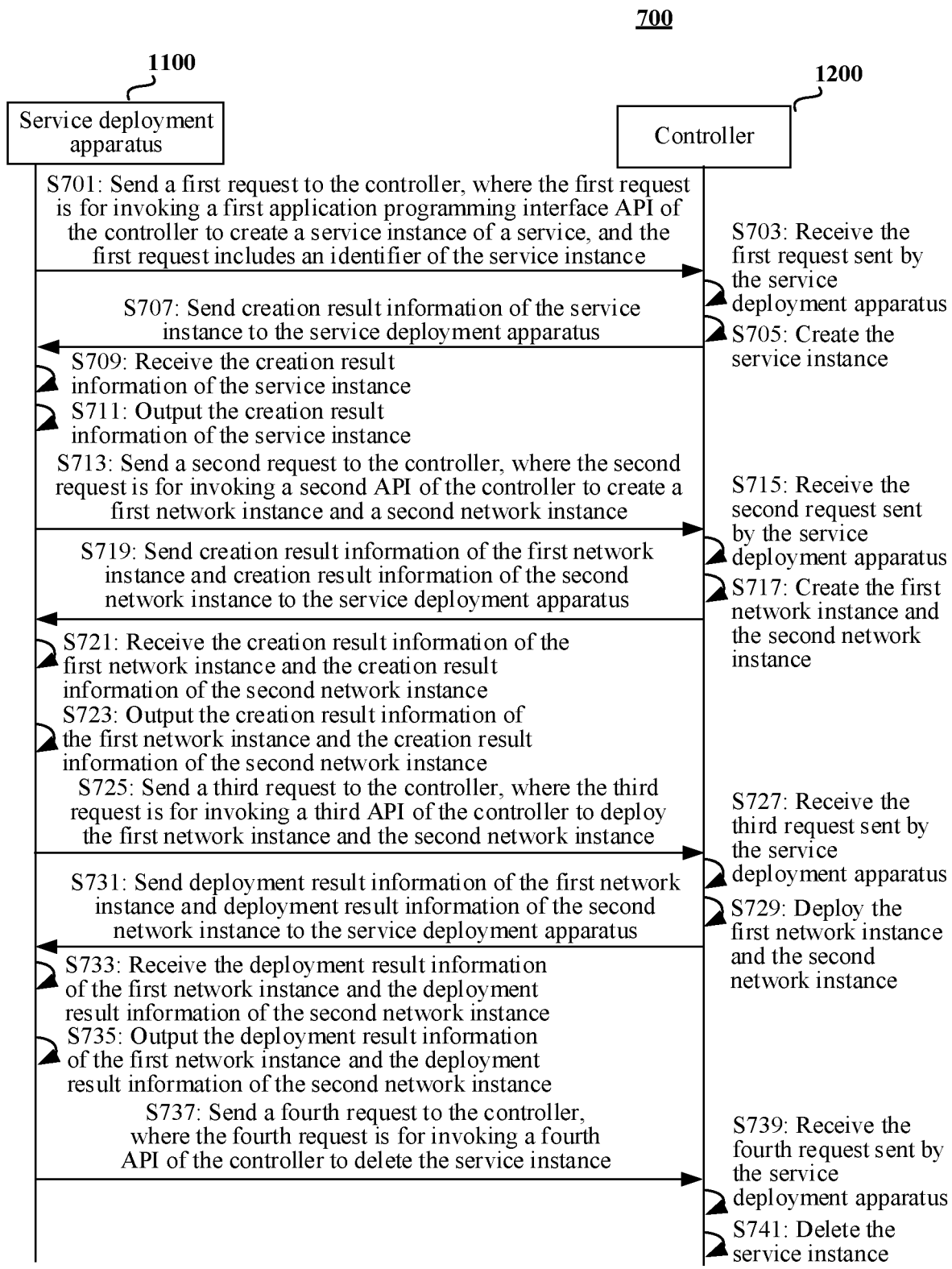
FIG. 7 is a flowchart of an implementation of a method for deploying a service according to an embodiment of this application.

FIG. 7 is a schematic flowchart of a method 700 for deploying a service according to this application. The method is performed by the service deployment apparatus 1100 and the controller 1200 in FIG. 2, and the method includes the following steps.

S701: The service deployment apparatus sends a first request to the controller, where the first request is for invoking a first API of the controller to create a service instance of a service, and the first request includes an identifier of the service instance.

The service deployment apparatus sends the first request to the controller. The first request is for invoking a first API of the controller to create the service instance of the service. The first request includes the identifier of the service instance.

In some embodiments, a service provider uses the service deployment apparatus 1100 shown in FIG. 1A to perform service deployment in a virtual cloud private network, and the controller 1200 provides an API of the controller 1200 for the service deployment apparatus 1100 to invoke, to complete the service deployment. The controller 1200 provides a third-party system with a service instance creating API. The service deployment apparatus 1100 sends the first request to the controller 1200, where the first request is for invoking a first API of the controller 1200, for example, the service instance creating API, to create the service instance of the service. The first request includes the identifier of the service instance, and the identifier of the service instance includes information that can identify the service instance, such as a name or an ID of the service instance. The first request further includes a type of the service instance, an identifier of a tenant, order information of the tenant, or the like. The type of the service instance includes single cloud and multi cloud. The identifier of the tenant includes a name, an ID, or the like of the tenant. The order information of the tenant includes an order number, an order name, or the like.

S703: The controller receives the first request sent by the service deployment apparatus.

The controller receives the first request sent by the service deployment apparatus. The first request is for invoking the first API of the controller to create the service instance of the service.

In embodiments, the controller 1200 shown in FIG. 1A receives the first request sent by the service deployment apparatus 1100.

S705: The controller creates the service instance.

The controller creates the service instance based on the identifier that is of the service instance and that is in the first request.

In embodiments, after receiving the first request, the controller 1200 shown in FIG. 1A creates the corresponding service instance based on the identifier that is of the service instance and that is in the first request. For an example procedure in which the controller 1200 creates the service instance, refer to related descriptions of S401. Details are not described herein again.

S707: The controller sends creation result information of the service instance to the service deployment apparatus.

The controller sends the creation result information of the service instance to the service deployment apparatus.

In embodiments, after creating the service instance, the controller 1200 shown in FIG. 1A sends the creation result information of the service instance to the service deployment apparatus 1100. The creation result information of the service instance includes but is not limited to the identifier of the service instance, a creation success flag of the service instance, a creation failure flag of the service instance, or a creation failure cause of the service instance.

Optionally, in some embodiments, after completing creating the service instance, the controller 1200 shown in FIG. 1A sends the creation result information of the service instance to the service deployment apparatus 1100.

Optionally, in some other embodiments, the service deployment apparatus 1100 shown in FIG. 1A sends a service instance creation query request to the controller 1200, where the query request is for querying the controller 1200 for the creation result information of the service instance. After receiving the query request, the controller 1200 sends the creation result information of the service instance to the service deployment apparatus 1100.

S709: The service deployment apparatus receives the creation result information, sent by the controller, of the service instance.

The service deployment apparatus receives the creation result information, sent by the controller, of the service instance.

Optionally, in some embodiments, after completing creating the service instance, the controller 1200 shown in FIG. 1A sends the creation result information of the service instance to the service deployment apparatus 1100. The service deployment apparatus 1100 receives the creation result information, sent by the controller, of the service instance.

Optionally, in some other embodiments, the service deployment apparatus 1100 shown in FIG. 1A sends a service instance creation query request to the controller 1200, where the query request is for querying the controller 1200 for the creation result information of the service instance. After receiving the query request, the controller 1200 sends the creation result information of the service instance to the service deployment apparatus 1100. The service deployment apparatus 1100 receives the creation result information, sent by the controller, of the service instance.

S711: The service deployment apparatus outputs the creation result information of the service instance.

The service deployment apparatus outputs the creation result information of the service instance.

Optionally, the service deployment apparatus 1100 shown in FIG. 1A may display the obtained creation result information of the service instance on a display interface of the service deployment apparatus 1100 or a display interface of a third-party system. The service deployment apparatus 1100 may alternatively export the obtained creation result information of the service instance to network personnel in a file format such as word, txt, or excel. The service deployment apparatus 1100 may alternatively open the obtained creation result information of the service instance to another service system through an API. A manner in which the service deployment apparatus outputs the creation result information of the service instance is not described one by one herein.

S713: The service deployment apparatus sends a second request to the controller, where the second request is for invoking a second API of the controller to create a first network instance and/or a second network instance.

The service deployment apparatus sends the second request to the controller. The second request is for invoking the second API of the controller to create the first network instance and the second network instance.

In some embodiments, the controller 1200 shown in FIG. 1A provides the second API for a third-party system to create a network instance. The second API supports creation of one network instance or creation of a plurality of network instances in batches.

When the second API supports only creation of one network instance, the service deployment apparatus 1100 shown in FIG. 1A sends the second request to the controller 1200. The second request is for invoking the second API of the controller 1200 to create the first network instance. The second request includes information for creating the first network instance. The information for creating the first network instance includes the identifier of the service instance, an identifier of the first network instance, and a device identifier of a first device. The first network instance is for deploying the service, the first network instance is a network instance corresponding to the first device, and the first network instance includes the device identifier of the first device. The service deployment apparatus 1100 sends the second request to the controller 1200. The second request is further for invoking the second API of the controller 1200 to create the second network instance. The second request includes information for creating the second network instance. The information for creating the second network instance includes the identifier of the service instance, an identifier of the second network instance, and a device identifier of a first cloud PE. The second network instance is for deploying the service. The second network instance is a network instance corresponding to the first cloud PE, and the second network instance includes the device identifier of the first cloud PE. The first cloud PE is for connecting to a first cloud.

When the second API supports only creation of a plurality of network instances in batches, the service deployment apparatus 1100 sends the second request to the controller 1200. The second request is for invoking the second API of the controller 1200 to create the first network instance and the second network instance. The second request includes information for creating the first network instance and information for creating the second network instance. The information for creating the first network instance includes the identifier of the service instance, an identifier of the first network instance, and a device identifier of a first device. The information for creating the second network instance includes the identifier of the service instance, an identifier of the second network instance, and a device identifier of a first cloud PE. The first network instance and the second network instance are for deploying the service. The first network instance is a network instance corresponding to the first device, and includes the device identifier of the first device. The second network instance is a network instance corresponding to the first cloud PE, and includes the device identifier of the first cloud PE. The first cloud PE is for connecting to a first cloud.

S715: The controller receives the second request sent by the service deployment apparatus.

The controller receives the second request sent by the service deployment apparatus. The second request is for invoking the second API of the controller to create the first network instance and the second network instance.

Optionally, when the second API of the controller supports only creation of one network instance, the controller 1200 shown in FIG. 1A receives the second request sent by the service deployment apparatus 1100. The second request is for invoking the second API of the controller to create the first network instance. The second request includes the identifier of the service instance, the identifier of the first network instance, and the device identifier of the first device.

Optionally, when the second API of the controller supports only creation of one network instance, the controller 1200 receives the second request sent by the service deployment apparatus 1100. The second request is for invoking the second API of the controller to create the second network instance. The second request includes the identifier of the service instance, the identifier of the second network instance, and the device identifier of the first cloud PE.

Optionally, when the second API of the controller supports creation of a plurality of network instances in batches, the controller 1200 receives the second request sent by the service deployment apparatus 1100. The second request is for invoking the second API of the controller to create the first network instance and the second network instance. The second request includes the identifier of the service instance, the identifier of the first network instance, the identifier of the second network instance, and the device identifier of the first cloud PE.

S717: The controller creates the first network instance and the second network instance.

The controller creates the first network instance and the second network instance based on the second request.

After the controller 1200 shown in FIG. 1A receives the second request, the controller 1200 creates the first network instance and the second network instance. For an example procedure in which the controller 1200 creates the network instance, refer to related descriptions of S403. Details are not described herein again.

S719: The controller sends creation result information of the first network instance and a creation result information of the second network instance to the service deployment apparatus.

The controller sends the creation result information of the first network instance and the creation result information of the second network instance to the service deployment apparatus.

The controller 1200 shown in FIG. 1A sends the creation result information of the first network instance and the creation result information of the second network instance to the service deployment apparatus 1100.

Optionally, in some embodiments, after completing creating the network instance, the controller 1200 shown in FIG. 1A sends, to the service deployment apparatus 1100, creation result information of the network instance, for example, the creation result information of the first network instance and the creation result information of the second network instance.

Optionally, in some other embodiments, the service deployment apparatus 1100 shown in FIG. 1A sends a network instance creation query request to the controller 1200, where the query request is for querying the controller 1200 for the creation result information of the network instance. After receiving the query request, the controller 1200 sends the creation result information of the network instance to the service deployment apparatus 1100.

S721: The service deployment apparatus receives the creation result information of the first network instance and the creation result information of the second network instance that are sent by the controller.

The service deployment apparatus receives the creation result information of the first network instance and the creation result information of the second network instance that are sent by the controller. The creation result information of the first network instance includes but is not limited to the identifier of the first network instance, a creation success flag of the first network instance, a creation failure flag of the first network instance, or a creation failure cause of the first network instance. The creation result information of the second network instance includes but is not limited to the identifier of the second network instance, a creation success flag of the second network instance, a creation failure flag of the second network instance, or a creation failure cause of the second network instance.

Optionally, in some embodiments, after completing creating the network instance, the controller 1200 shown in FIG. 1A sends, to the service deployment apparatus 1100, creation result information of the network instance, for example, the creation result information of the first network instance and the creation result information of the second network instance. The service deployment apparatus 1100 receives the creation result information, sent by the controller, of the network instance.

Optionally, in some other embodiments, the service deployment apparatus 1100 shown in FIG. 1A sends a network instance creation query request to the controller 1200, where the query request is for querying the controller 1200 for the creation result information of the network instance. After receiving the query request, the controller 1200 sends the creation result information of the network instance to the service deployment apparatus 1100. The service deployment apparatus 1100 receives the creation result information, sent by the controller, of the network instance.

S723: The service deployment apparatus outputs the creation result information of the first network instance and the creation result information of the second network instance.

The service deployment apparatus outputs the creation result information of the first network instance and the creation result information of the second network instance.

Optionally, the service deployment apparatus 1100 shown in FIG. 1A may display the obtained creation result information of the network instance on a display interface of the service deployment apparatus 1100 or a display interface of a third-party system. The service deployment apparatus 1100 may alternatively export the obtained creation result information of the network instance to network personnel in a file format such as word, txt, or excel. The service deployment apparatus 1100 may alternatively open the obtained creation result information of the network instance to another service system in a manner such as an API. A manner in which the service deployment apparatus outputs the creation result information of the network instance is not described one by one herein.

S725: The service deployment apparatus sends a third request to the controller, where the third request is for invoking a third API of the controller to deploy the first network instance and the second network instance.

The service deployment apparatus sends the third request to the controller. The third request is for invoking the third API of the controller to deploy the first network instance and the second network instance.

In some embodiments, the controller 1200 shown in FIG. 1A provides the third API for a third-party system to deploy a network instance. The third API is for deploying one network instance and/or deploying a plurality of network instances in batches.

When the third API is for deploying only one network instance, the service deployment apparatus 1100 shown in FIG. 1A sends the third request to the controller 1200. The third request is for invoking the third API of the controller 1200 to deploy the first network instance. The third request includes information for deploying the first network instance. The information for deploying the first network instance includes the identifier of the service instance and the identifier of the first network instance.

When the third API is for deploying only one network instance, the service deployment apparatus 1100 shown in FIG. 1A sends the third request to the controller 1200. The third request is for invoking the third API of the controller 1200 to deploy the second network instance. The third request includes information for deploying the second network instance. The information for deploying the second network instance includes the identifier of the service instance and the identifier of the second network instance.

When the third API is for deploying a plurality of network instances in batches, the service deployment apparatus 1100 shown in FIG. 1A sends the third request to the controller 1200. The third request is for invoking the third API of the controller 1200 to deploy the first network instance and the second network instance. The third request includes information for deploying the first network instance and information for deploying the second network instance. The information for deploying the first network instance includes the identifier of the service instance and the identifier of the first network instance. The information for deploying the second network instance includes the identifier of the service instance and the identifier of the second network instance.

S727: The controller receives the third request sent by the service deployment apparatus.

The controller receives the third request sent by the service deployment apparatus. The third request is for invoking the third API of the controller to deploy the first network instance and the second network instance.

The controller 1200 receives the third request sent by the service deployment apparatus 1100.

In some embodiments, the controller 1200 provides the third API for a third-party system to deploy a network instance. The third API is for deploying one network instance and/or deploying a plurality of network instances in batches.

When the third API is for deploying only one network instance, the third request is for invoking the third API of the controller 1200 to deploy the first network instance. The third request includes information for deploying the first network instance. The information for deploying the first network instance includes the identifier of the service instance and the identifier of the first network instance.

When the third API is for deploying only one network instance, the third request is for invoking the third API of the controller 1200 to deploy the second network instance. The third request includes information for deploying the second network instance. The information for deploying the second network instance includes the identifier of the service instance and the identifier of the second network instance.

When the third API is for deploying a plurality of network instances in batches, the third request is for invoking the third API of the controller 1200 to deploy the first network instance and the second network instance. The third request includes information for deploying the first network instance and information for deploying the second network instance. The information for deploying the first network instance includes the identifier of the service instance and the identifier of the first network instance. The information for deploying the second network instance includes the identifier of the service instance and the identifier of the second network instance.

S7029: The controller deploys the first network instance and the second network instance.

The controller deploys the first network instance and the second network instance based on the third request.

After receiving the third request, the controller 1200 shown in FIG. 1A deploys the first network instance and the second network instance. For an example procedure in which the controller 1200 deploys the first network instance and the second network instance, refer to related descriptions of S405. Details are not described herein again.

S731: The controller sends deployment result information of the first network instance and deployment result information of the second network instance to the service deployment apparatus.

The controller sends the deployment result information of the first network instance and the deployment result information of the second network instance to the service deployment apparatus. The deployment result information of the first network instance includes but is not limited to the identifier of the first network instance, a deployment success flag of the first network instance, a deployment failure flag of the first network instance, or a deployment failure cause of the first network instance. The deployment result information of the second network instance includes but is not limited to the identifier of the second network instance, a deployment success flag of the second network instance, a deployment failure flag of the second network instance, or a deployment failure cause of the second network instance.

The controller 1200 shown in FIG. 1A sends the deployment result information of the first network instance and the deployment result information of the second network instance to the service deployment apparatus 1100.

Optionally, in some embodiments, after completing deploying the network instance, the controller 1200 shown in FIG. 1A sends, to the service deployment apparatus 1100, deployment result information of the network instance, for example, the deployment result information of the first network instance and the deployment result information of the second network instance.

Optionally, in some other embodiments, the service deployment apparatus 1100 shown in FIG. 1A sends a network instance deployment query request to the controller 1200, where the query request is for querying the controller 1200 for the deployment result information of the network instance. After receiving the query request, the controller 1200 sends the deployment result information of the network instance to the service deployment apparatus 1100.

S733: The service deployment apparatus receives the deployment result information of the first network instance and the deployment result information of the second network instance that are sent by the controller.

The service deployment apparatus receives the deployment result information of the first network instance and the deployment result information of the second network instance that are sent by the controller.

Optionally, in some embodiments, after completing deploying the network instance, the controller 1200 shown in FIG. 1A sends, to the service deployment apparatus 1100, deployment result information of the network instance, for example, the deployment result information of the first network instance and the deployment result information of the second network instance. The service deployment apparatus 1100 receives the deployment result information, sent by the controller, of the network instance.

Optionally, in some other embodiments, the service deployment apparatus 1100 shown in FIG. 1A sends a network instance deployment query request to the controller 1200, where the query request is for querying the controller 1200 for the deployment result information of the network instance. After receiving the query request, the controller 1200 sends the deployment result information of the network instance to the service deployment apparatus 1100. The service deployment apparatus 1100 receives the deployment result information, sent by the controller, of the network instance.

S735: Output the deployment result information of the first network instance and the deployment result information of the second network instance.

The service deployment apparatus outputs the deployment result information of the first network instance and the deployment result information of the second network instance.

Optionally, the service deployment apparatus 1100 shown in FIG. 1A may display the obtained deployment result information of the network instance on a display interface of the service deployment apparatus 1100 or a display interface of a third-party system. The service deployment apparatus 1100 may alternatively export the obtained deployment result information of the network instance to network personnel in a file format such as word, txt, or excel. The service deployment apparatus 1100 may alternatively open the obtained deployment result information of the network instance to another service system in a manner such as an API. A manner in which the service deployment apparatus outputs the deployment result information of the network instance is not described one by one herein.

S737: The service deployment apparatus sends a fourth request to the controller, where the fourth request is for invoking a fourth API of the controller to delete the service instance.

The service deployment apparatus sends the fourth request to the controller. The fourth request is for invoking the fourth API of the controller to delete the service instance.

The service deployment apparatus 1100 shown in FIG. 1A sends the fourth request to the controller 1200. The fourth request is for invoking the fourth API of the controller 1200 to delete the service instance and the network instance in the service instance. The fourth API of the controller 1200 is for deleting the created service instance. The fourth request includes the identifier of the to-be-deleted service instance.

S739: The controller receives the fourth request sent by the service deployment apparatus.

The controller receives the fourth request sent by the service deployment apparatus. The fourth request is for invoking the fourth API of the controller to delete the service instance.

The controller 1200 shown in FIG. 1A receives the fourth request sent by the service deployment apparatus 1100.

S741: The controller deletes the service instance.

The controller deletes the service instance.

After receiving the fourth request sent by the service deployment apparatus 1100, the controller 1200 shown in FIG. 1A deletes the service instance specified in the fourth request.

An example method is as follows.

The controller first determines whether there is a deployed network instance in the to-be-deleted service instance. If there is no deployed network instance, the controller deletes the corresponding service instance from the controller based on the identifier that is of the service instance and that is carried in the fourth request.

If the to-be-deleted service instance includes the deployed network instance, the controller obtains information about the corresponding service instance based on the identifier of the service instance. The information about the service instance includes a type of the service instance, information about the created network instance, the order information of the tenant, and the like. The created network instance is obtained based on the information about the created network instance in the information about the service instance. The network device corresponding to the network instance is obtained based on the information about the created network instance. Before deleting configuration information that is related to the service instance and that is in the network device, the controller needs to determine whether the network device has a network resource shared by another service instance. If there is no shared network resource, the controller deletes the configuration information related to the service instance, and deletes the network instance related to the service instance, to complete a deletion operation. If there is the shared network resource, the controller does not delete the configuration information, and ends the deletion operation. The configuration information includes tunnel configuration information, VPN instance information, and routing information.

The service deployment apparatus invokes a service-oriented API of the controller, to directly create the service instance corresponding to the virtual cloud private network service, and creates the corresponding first network instance and second network instance in the service instance. Deployment of the first network instance and the second network instance reduces a quantity of interactions between the service deployment apparatus and the controller, reduces complexity of manual configuration and difficulty of the service deployment, and improves efficiency of the service deployment.

Figure 8:
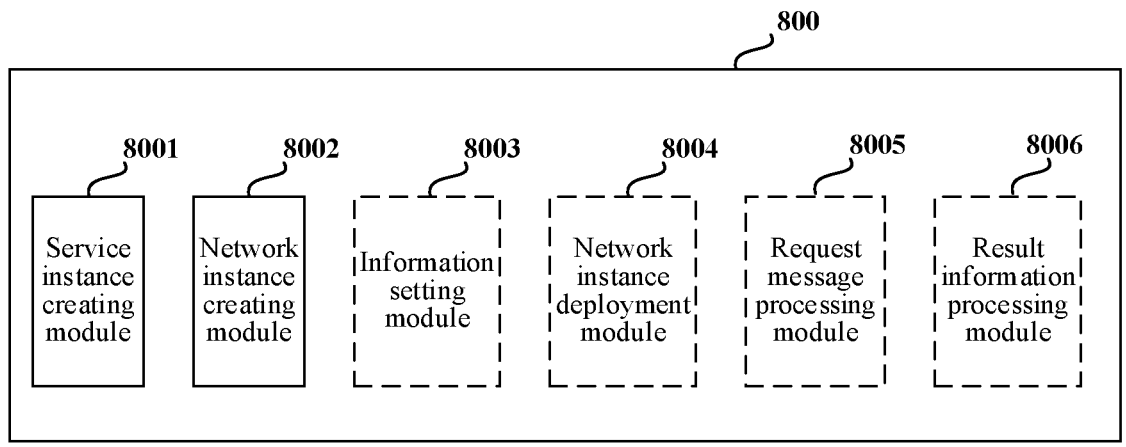
FIG. 8 is a schematic diagram of an architecture of a system for deploying a service according to an embodiment of this application.

FIG. 8 is a schematic diagram of a structure of a system 800 for deploying a service according to an embodiment of this application. The system 800 for deploying the service is for performing, by using the service deployment apparatus 1100 and the controller 1200 shown in FIG. 7, the plurality of embodiments, for example, an operation performed by the system for deploying a service in embodiments corresponding to FIG. 4A to FIG. 4C. As shown in modules corresponding to solid-line boxes in FIG. 8, the system 800 for deploying the service includes the following modules.

A service instance creating module 8001 that is configured to create a service instance corresponding to the service.

A network instance creating module 8002 that is configured to create a first network instance and a second network instance in the service instance. The first network instance and the second network instance are for deploying the service. The first network instance is a network instance corresponding to a first device. The first network instance includes a device identifier of the first device. The second network instance is a network instance corresponding to a first cloud PE. The second network instance includes a device identifier of the first cloud PE. The first cloud PE is for connecting to a first cloud.

In some embodiments, as shown in modules corresponding to dashed-line boxes in FIG. 8, the system 800 for deploying the service further includes an information setting module 8003. The information setting module 8003 is configured to set connection information of the first cloud PE for connecting to the first cloud. The connection information includes one or more of the following such as the device identifier of the first cloud PE, location information of the first cloud PE, an identifier of a first interface of the first cloud PE, or an identifier of a first VLAN of the first cloud PE. The first interface is used by the first cloud PE to connect to the first cloud. The first VLAN is used by the first cloud PE to connect to the first cloud. The information setting module 8003 is further configured to set a first service template based on a type of the service instance.

In some embodiments, as shown in modules corresponding to dashed-line boxes in FIG. 8, the system 800 for deploying the service further includes a network instance deployment module 8004.

The network instance deployment module 8004 is configured to deploy the first network instance and the second network instance. The network instance deployment module 8004 is further configured to send first configuration information to the first device. The first configuration information is for configuring the service. The network instance deployment module 8004 is further configured to send second configuration information to the first cloud PE. The second configuration information is for configuring the service. The network instance deployment module 8004 is further configured to determine the first configuration information and the second configuration information based on the first network instance, the second network instance, and the first service template. The first service template indicates configuration information of the service instance. The configuration information of the service instance includes one or more of the following such as tunnel configuration information, VPN instance configuration information, or routing information.

In some embodiments, as shown in modules corresponding to dashed-line boxes in FIG. 8, the system 800 for deploying the service further includes a request message processing module 8005.

The request message processing module 8005 is configured to receive a first request sent by a service deployment apparatus. The first request is for invoking a first API of the controller to create the service instance, and the first request includes the identifier of the service instance.

The request message processing module 8005 is further configured to receive a second request sent by the service deployment apparatus. The second request is for invoking a second API of the controller to create the first network instance and/or the second network instance. The second request includes information for creating the first network instance and/or information for creating the second network instance. The information for creating the first network instance includes the identifier of the service instance, an identifier of the first network instance, and the device identifier of the first device. The information for creating the second network instance includes the identifier of the service instance, an identifier of the second network instance, and the device identifier of the first cloud PE.

The request message processing module 8005 is further configured to receive a third request sent by the service deployment apparatus. The third request is for invoking a third API of the controller to deploy the first network instance and/or the second network instance. The third request includes information for deploying the first network instance and/or information for deploying the second network instance. The information for deploying the first network instance includes the identifier of the service instance and the identifier of the first network instance. The information for deploying the second network instance includes the identifier of the service instance and the identifier of the second network instance.

The request message processing module 8005 is further configured to receive a fourth request sent by the service deployment apparatus. The fourth request is for invoking a fourth API of the controller to obtain a deployment result of the first network instance and/or a deployment result of the second network instance.

In some embodiments, the request message processing module 8005 is further configured to send a first request to a controller. The first request is for invoking a first API of the controller to create the service instance of the service, and the first request includes the identifier of the service instance.

The request message processing module 8005 is further configured to send a second request to the controller. The second request is for invoking a second API of the controller to create the first network instance and/or the second network instance. The second request includes information for creating the first network instance and/or information for creating the second network instance. The information for creating the first network instance includes the identifier of the service instance, an identifier of the first network instance, and the device identifier of the first device. The information for creating the second network instance includes the identifier of the service instance, an identifier of the second network instance, and the device identifier of the first cloud PE. The first network instance and the second network instance are for deploying the service. The first network instance is a network instance corresponding to the first device, and the first network instance includes the device identifier of the first device. The second network instance is a network instance corresponding to the first cloud PE, and the second network instance includes the device identifier of the first cloud PE. The first cloud PE is for connecting to the first cloud. The request message processing module 8005 is further configured to send a third request to the controller, where the third request is for invoking a third API of the controller to deploy the first network instance and the second network instance. The third request includes information for deploying the first network instance and/or information for deploying the second network instance. The information for deploying the first network instance includes the identifier of the service instance and the identifier of the first network instance. The information for deploying the second network instance includes the identifier of the service instance and the identifier of the second network instance.

In some embodiments, as shown in modules corresponding to dashed-line boxes in FIG. 8, the system 800 for deploying the service further includes a result information processing module 8006.

The result information processing module 8006 is configured to send the deployment result of the first network instance and/or the deployment result of the second network instance to the service deployment apparatus.

In some embodiments, the result information processing module 8006 is further configured to receive creation result information, sent by the controller, of the service instance. The result information processing module 8006 is further configured to output the creation result information of the service instance. The result information processing module 8006 is further configured to receive creation result information of the first network instance and/or a creation result information of the second network instance that are/is sent by the controller. The result information processing module 8006 is further configured to output the creation result information of the first network instance and/or the creation result information of the second network instance. The result information processing module 8006 is further configured to receive deployment result information of the first network instance and/or deployment result information of the second network instance that are/is sent by the controller. The result information processing module 8006 is further configured to output the deployment result information of the first network instance and/or the deployment result information of the second network instance.

The modules shown in FIG. 8 may be software functional modules or virtual functional modules, or may be hardware modules. In some embodiments, the modules in the system 800 for deploying the service may be deployed in a same physical device. In some other embodiments, the modules in the system 800 for deploying the service may be deployed in a plurality of different physical devices. Each module in the system 800 for deploying the service may be a hardware module or a module combining software and hardware. For example, the service instance creating module 8001, the network instance creating module 8002, the information setting module 8003, the network instance deployment module 8004, the request message processing module 8005, and the result information processing module in the system 800 for deploying the service may be deployed in one physical device, and are configured to perform the method 700 performed by the controller 1200 in the embodiment shown in FIG. 7. For example, the request message processing module 8005 and the result information processing module in the system 800 for deploying the service may be deployed in another physical device, and are configured to perform the method 700 performed by the service deployment apparatus 1100 in the embodiment shown in FIG. 7.

Figure 9:
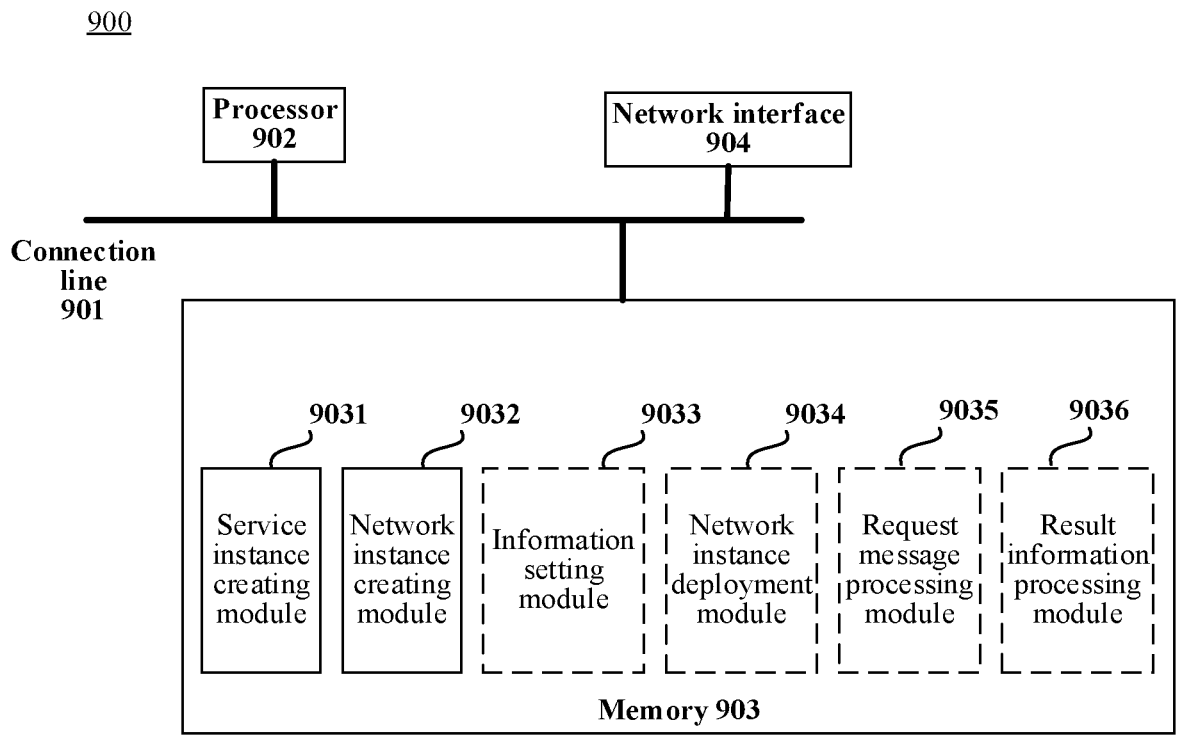
FIG. 9 is a schematic diagram of an architecture of an apparatus for deploying a service according to an embodiment of this application.

FIG. 9 is a schematic diagram of a structure of an apparatus for deploying a service according to an embodiment of this application. The apparatus 900 for deploying the service shown in FIG. 9 is configured to perform the plurality of embodiments, for example, an operation performed by the service deployment apparatus 1100 or the controller 1200 in the embodiment corresponding to FIG. 7. As shown in FIG. 9, the apparatus 900 includes at least one processor 901, a connection line 902, a memory 903, and at least one network interface 904. The memory 903 is configured to store a program module and data. In some embodiments, as shown in program modules corresponding to solid-line boxes in FIG. 9, the program module stored in the memory 903 includes a service instance creating module 9031 and a network instance creating module 9032.

When being executed by the processor 901, the service instance creating module 9031 is configured to create a service instance corresponding to a service.

When being executed by the processor 901, the network instance creating module 9032 is configured to create a first network instance and a second network instance in the service instance. The first network instance and the second network instance are for deploying the service. The first network instance is a network instance corresponding to a first device. The first network instance includes a device identifier of the first device. The second network instance is a network instance corresponding to a first cloud PE. The second network instance includes a device identifier of the first cloud PE. The first cloud PE is for connecting to a first cloud.

In some other embodiments, as shown in program modules corresponding to dashed-line boxes in FIG. 9, the program module stored in the memory 903 includes one or more of the following modules such as an information setting module 9033, a network instance deployment module 9034, a request message processing module 9035, and a result information processing module 9036.

When being executed by the processor 901, the information setting module 9033 is configured to set connection information of the first cloud PE for connecting to the first cloud. The connection information includes one or more of the following such as the device identifier of the first cloud PE, location information of the first cloud PE, an identifier of a first interface of the first cloud PE, or an identifier of a first VLAN of the first cloud PE. The first interface is used by the first cloud PE to connect to the first cloud. The first VLAN is used by the first cloud PE to connect to the first cloud. The information setting module 8003 is further configured to set a first service template based on a type of the service instance.

When being executed by the processor 901, the network instance deployment module 9034 is configured to perform the method steps performed by the controller described in S405 in the method 400 shown in FIG. 4A. Details are not described herein again.

In some embodiments, when being executed by the processor 901, the request message processing module 9035 is configured to perform the method steps performed by the controller 1200 described in the method 700 shown in FIG. 7. Details are not described herein again.

In some embodiments, when being executed by the processor 901, the request message processing module 9035 is configured to perform the method steps performed by the service deployment apparatus 1100 described in the method 700 shown in FIG. 7. Details are not described herein again.

When being executed by the processor 901, the result information processing module 9036 is configured to perform the method steps performed by the service deployment apparatus 1100 described in the method 700 shown in FIG. 7. Details are not described herein again. The processor 901 is, for example, a general-purpose central processing unit (CPU), a digital signal processor (DSP), a network processor (NP), a graphics processing unit (GPU), a neural network processor (NPU), a data processing unit (DPU), a microprocessor, or one or more integrated circuits configured to implement the solutions of this application. For example, the processor 901 includes an application-specific integrated circuit (ASIC), a programmable logic device (PLD) or another PLD, a transistor logic device, a hardware component, or any combination thereof. The PLD is, for example, a complex PLD (CPLD), a field-programmable gate array (FPGA), generic array logic (GAL), or any combination thereof. The processor may implement or execute various logical blocks, modules, and circuits described with reference to content disclosed in embodiments of this application. Alternatively, the processor may be a combination of processors implementing a computing function, for example, a combination of one or more microprocessors, or a combination of a DSP and a microprocessor.

The apparatus 900 for deploying the service may further include the connection line 902. The connection line 902 is configured to transmit information between components of the apparatus 900 for deploying the service. The bus may be a Peripheral Component Interconnect (PCI) bus or an Extended Industry Standard Architecture (EISA) bus, or the like. Buses may be classified into an address bus, a data bus, a control bus, and the like. For ease of representation, only one thick line is used to represent the bus in FIG. 9, but this does not mean that there is only one bus or only one type of bus.

The memory 903 is, for example, a read-only memory (ROM) or another type of static storage device that can store static information and instructions, a random-access memory (RAM) or another type of dynamic storage device that can store information and instructions, or an electrically erasable programmable ROM (EEPROM), a compact disc ROM (CD-ROM) or another compact disc storage, an optical disc storage (including a compressed optical disc, a laser disc, an optical disc, a digital versatile disc (DVD), a BLU-RAY disc, or the like), a magnetic disk storage medium or another magnetic storage device, or any other medium that can be for carrying or storing expected program code in a form of instructions or a data structure and that can be accessed by a computer. However, the memory 903 is not limited thereto. For example, the memory 903 exists independently, and is connected to the processor 901 through the bus. Alternatively, the memory 903 and the processor 901 may be integrated together.

The network interface 904 is any transceiver-type apparatus, and is configured to communicate with another device or a communication network. The communication network may be the Ethernet, a radio access network (RAN), a wireless local area network (WLAN), or the like. The network interface 904 may include a wired communication interface, and may further include a wireless communication interface. In an example, the network interface 904 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the network interface 904 may be used by the apparatus 900 for deploying the service to communicate with another device.

In an implementation, in an embodiment, the processor 901 may include one or more CPUs. Each of the processors may be a single-core processor, or may be a multi-core processor. The processor herein may be one or more devices, circuits, and/or processing cores configured to process data (for example, computer program instructions).

During an implementation, in an embodiment, the apparatus 900 for deploying the service may include a plurality of processors. Each of the processors may be a single-core processor, or may be a multi-core processor. The processor herein may be one or more devices, circuits, and/or processing cores configured to process data (for example, computer program instructions).

During an implementation, in an embodiment, the apparatus 900 for deploying the service may further include an output device and an input device. The output device communicates with the processor 901, and may display information in a plurality of manners. For example, the output device may be a liquid-crystal display (LCD), a light-emitting diode (LED) display device, a cathode-ray tube (CRT) display device, or a projector. The input device communicates with the processor 901, and may receive an input from a user in a plurality of manners. For example, the input device may be a mouse, a keyboard, a touchscreen device, or a sensing device.

The apparatus 900 for deploying the service shown in FIG. 9 is configured to perform the plurality of embodiments, for example, an operation performed by the service deployment apparatus in the embodiment corresponding to FIG. 7. As shown in FIG. 9, the apparatus 900 for deploying the service includes the at least one processor 901. By executing a computer-readable program in the memory 903, the apparatus 900 for deploying the service may perform the plurality of embodiments, for example, an operation performed by the controller 1200 or the service deployment apparatus 1100 in the embodiment corresponding to FIG. 7.

An operation sequence in the specification, claims, and accompanying drawings of this application is not limited to a specific order or sequence in descriptions. It should be understood that the data termed in such a way are simultaneous or may be altered in appropriate circumstances so that described embodiments can be implemented in order other than the order illustrated or described in the accompanying drawings.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Some embodiments of this application provide a computer program product. When the computer program product is executed by a computer, the computer is enabled to perform an operation performed by the system for deploying the service in the plurality of embodiments of this application.

Some embodiments of this application provide a computer-readable storage medium, for example, a hard disk, a memory, or a flash memory. The computer storage medium stores computer-readable instructions. When executing the computer-readable instructions, a computer can perform an operation performed by the system for deploying the service in the plurality of embodiments of this application.

Some embodiments of this application provide a system for deploying a service, including a plurality of modules. The plurality of modules works together to perform an operation performed by the system for deploying the service in the plurality of embodiments of this application. The plurality of modules may be in a same hardware device, or may be in different hardware devices.

The foregoing descriptions are merely example embodiments of this application, but are not intended to limit the protection scope of this application. Any variation or replacement readily figured out by a person skilled in the art within the technical scope disclosed in this application shall fall within the protection scope of this application.

What is claimed is:

1. A method comprising:
creating, by a controller, a service instance corresponding to a service that provides a virtual cloud private network for a tenant, wherein edge devices of the virtual cloud private network for the tenant comprise a first device and a first cloud provider edge (PE);
creating, by the controller, a first network instance and a second network instance in the service instance,
wherein the first network instance and the second network instance are for deploying the service,
wherein the first network instance corresponds to the first device, wherein the first device is a device on a tenant site in a service provider network,
wherein the first network instance comprises a device identifier of the first device,
wherein the second network instance corresponds to the first cloud PE, and the first cloud PE is a device connected to a cloud side in the service provider network, and
wherein the second network instance comprises a device identifier of the first cloud PE; and
deploying, by the controller, the first network instance and the second network instance.

2. The method of claim 1, further comprising setting connection information of the first cloud PE for connecting to a first cloud, wherein the connection information comprises one or more of the device identifier of the first cloud PE, location information of the first cloud PE, an identifier of a first interface of the first cloud PE, or an identifier of a first virtual local area network (VLAN) of the first cloud PE, wherein the first VLAN is configured for the first interface, and wherein the first cloud PE is connected to the first cloud by using the first VLAN.

3. The method of claim 1, wherein the service instance comprises an identifier of the service instance.

4. The method of claim 3, wherein the service instance further comprises a type of the service instance, and the type of the service instance comprises single cloud or multi cloud, wherein the single cloud indicates that the tenant is capable of accessing only one cloud via the first device, and wherein the multi cloud indicates that the tenant is capable of accessing a plurality of clouds via the first device.

5. The method of claim 1, wherein the first device is first customer premises equipment (CPE), and the first network instance further comprises one or more of location information of the first CPE, a network side Internet Protocol (IP) address of the first CPE, a tenant side IP address of the first CPE, or routing information from the first CPE to a local area network of the tenant.

6. The method of claim 1, wherein the first device is a second cloud PE for connecting to a second cloud, and the first network instance further comprises one or more of location information of the second cloud PE, provider information of the second cloud, an Internet Protocol (IP) address of the second cloud PE for connecting to the second cloud, routing information of the second cloud PE for connecting to the second cloud, or interface quality of service information of the second cloud PE for connecting to the second cloud.

7. The method of claim 1, wherein the second network instance further comprises one or more of location information of the first cloud PE, provider information of the first cloud, an Internet Protocol (IP) address of the first cloud PE for connecting to the first cloud, routing information of the first cloud PE for connecting to the first cloud, or interface quality of service information of the first cloud PE for connecting to the first cloud.

8. The method of claim 1, wherein deploying the first network instance and the second network instance comprises:
   sending, to the first device, first configuration information for configuring the service; and
   sending, to the first cloud PE, second configuration information for configuring the service.

9. The method according to claim 8, further comprising:
   determining the first configuration information and the second configuration information based on the first network instance, the second network instance, and a first service template, wherein the first service template indicates configuration information of the service instance, and the configuration information of the service instance comprises one or more of the following:
   tunnel configuration information, virtual private network VPN instance configuration information, or routing information.

10. The method according to claim 9, wherein before deploying the first network instance and the second network instance, the method further comprises:
    setting the first service template based on the type of the service instance.

11. The method according to claim 1, wherein before creating the service instance, the method further comprises:
    receiving a first request sent by a service deployment apparatus, wherein the first request is for invoking a first application programming interface API of the controller to create the service instance, and the first request comprises the identifier of the service instance.

12. An apparatus for deploying a service and comprising:
    a memory configured to store computer-executable instructions; and
    one or more processors coupled to the memory and configured to execute the computer-executable instructions to cause the apparatus to:
      create a service instance corresponding to the service that provides a virtual cloud private network for a tenant, wherein edge devices of the virtual cloud private network for a tenant comprises a first device and a first cloud provider edge (PE);
      create a first network instance and a second network instance in the service instance,
      wherein the first network instance and the second network instance are for deploying the service,
      wherein the first network instance corresponds to the first device, wherein the first device is a device on a tenant site in a service provider network,
      wherein the first network instance comprises a device identifier of the first device,
      wherein the second network instance corresponds to the first cloud PE, and the first cloud PE is a device connected to a cloud side in the service provider network, and
      wherein the second network instance comprises a device identifier of the first cloud PE; and
      deploy the first network instance and the second network instance.

13. The apparatus of claim 12, wherein the one or more processors is further configured to execute the computer-executable instructions to cause the apparatus to set connection information of the first cloud PE for connecting to a first cloud, wherein the connection information comprises one or more of the device identifier of the first cloud PE, location information of the first cloud PE, an identifier of a first interface of the first cloud PE, or an identifier of a first virtual local area network (VLAN) of the first cloud PE, wherein the first VLAN is configured for the first interface, and wherein the first cloud PE is connected to the first cloud by using the first VLAN.

14. The apparatus of claim 12, wherein the service instance comprises a an identifier of the service instance.

15. The apparatus of claim 12, wherein the one or more processors is configured to execute the computer-executable instructions to cause the apparatus to:
    send, to the first device, first configuration information for configuring the service; and
    send, to the first cloud PE, second configuration information for configuring the service.

16. The apparatus of claim 15, wherein the first configuration information and the second configuration information are based on the first network instance, the second network instance, and a first service template, wherein the first service template indicates third configuration information of the service instance, and wherein the third configuration information comprises one or more of tunnel configuration information, virtual private network (VPN) instance configuration information, or routing information.

17. The apparatus of claim 16, wherein the one or more processors is further configured to execute the computer-executable instructions to cause the apparatus to set the first service template based on a type of the service instance.

18. The apparatus of claim 14, wherein the one or more processors is further configured to execute the computer-executable instructions to cause the apparatus to receive a first request from a service deployment apparatus, wherein the first request is for invoking a first application programming interface (API) of the apparatus to create the service instance, and wherein the first request comprises the first identifier of the service instance.

19. The apparatus of claim 18, wherein one or more processors is further configured to execute the computer-executable instructions to cause the apparatus to receive a second request from the service deployment apparatus, wherein the second request is for invoking a second API of the apparatus to create at least one of the first network instance or the second network instance, wherein the second request comprises at least one of first information for creating the first network instance or second information for creating the second network instance, wherein the first information comprises the first identifier of the service instance, a second identifier of the first network instance, and the first device identifier, and wherein the second information comprises the first identifier of the service instance, a third identifier of the second network instance, and the second device identifier.

20. The apparatus of claim 18, wherein the one or more processors is further configured to execute the computer-executable instructions to cause the apparatus to receive a third request from the service deployment apparatus, wherein the third request is for invoking a third API of the apparatus to deploy at least one of the first network instance or the second network instance, wherein the third request comprises at least one of first information for deploying the first network instance or second information for deploying the second network instance, wherein the first information comprises the first identifier and a second identifier of the first network instance, and wherein the second information comprises the first identifier of the service instance and the second identifier of the second network instance.

\* \* \* \* \*

UNITED STATES PATENT AND TRADEMARK OFFICE
CERTIFICATE OF CORRECTION

Page 1 of 1

PATENT NO. : 12,425,312 B2
APPLICATION NO. : 18/468136
DATED : September 23, 2025
INVENTOR(S) : Zhong Chen, Bin Dong and Wenqiang Wang It is certified that error appears in the above-identified patent and that said Letters Patent is hereby corrected as shown below:

In the Claims

Claim 14, Column 50, Line 16: "instance comprises a an identifier of the service instance." should read "instance comprises an identifier of the service instance."

Signed and Sealed this
Twenty-eighth Day of October, 2025

John A. Squires
*Director of the United States Patent and Trademark Office*